(12) United States Patent
Cook et al.

(10) Patent No.: US 12,356,954 B2
(45) Date of Patent: Jul. 15, 2025

(54) PET WASTE ROLL ASSEMBLY

(71) Applicant: BRILLIANT PET 2 LLC, Chicago, IL (US)

(72) Inventors: Alan Jay Cook, Chicago, IL (US); Kristin W. Grube, Bloomington, IN (US); Kevin John Augustyniak, Elma, NY (US)

(73) Assignee: BRILLIANT PET 2 LLC, Chicago, IL (US)

( * ) Notice: Subject to any disclaimer, the term of this patent is extended or adjusted under 35 U.S.C. 154(b) by 454 days.

(21) Appl. No.: 17/706,387

(22) Filed: Mar. 28, 2022

(65) Prior Publication Data

US 2022/0210998 A1 Jul. 7, 2022

Related U.S. Application Data

(63) Continuation-in-part of application No. 16/698,559, filed on Nov. 27, 2019, now Pat. No. 12,239,094,
(Continued)

(51) Int. Cl.
*A01K 1/015* (2006.01)
*A01K 1/01* (2006.01)
(Continued)

(52) U.S. Cl.
CPC .......... *A01K 1/0117* (2013.01); *A01K 1/0157* (2013.01); *B32B 3/266* (2013.01);
(Continued)

(58) Field of Classification Search
CPC .................................................. A01K 1/0117
See application file for complete search history.

(56) References Cited

U.S. PATENT DOCUMENTS

| 344,770 A | 6/1886 | Currier |
| 715,729 A | 12/1902 | Zimmermann |

(Continued)

FOREIGN PATENT DOCUMENTS

| CA | 104261 | 3/2004 |
| CN | 302331550 | 2/2013 |

(Continued)

OTHER PUBLICATIONS

"BrilliantPad Self-Cleaning Dog Potty." Shark Tank Products (online) 5 pgs. Available Oct. 31, 2017. [Retrieved Sep. 19, 2022] https://allsharktankproducts.com/pet-care/brilliantpad-self-cleaning-dog-potty/ (Year: 2017).

(Continued)

*Primary Examiner* — Magdalena Topolski
(74) *Attorney, Agent, or Firm* — J. Miguel Hernandez; James R. Gourley; Carstens, Allen & Gourley, LLP

(57) ABSTRACT

A sprocket adapter configured to roll up a waste pad. The sprocket adapter includes a sprocket, a first tube, a second tube, and a set of fins. The first and second tubes extend from the sprocket configured to couple with the take-up rod. The set of fins extends from the first side of the sprocket to couple with a pet waste pad. An end cap is configured to removably couple to a sprocket adapter comprising an aperture having two slotted portions, and a set of flaps. The aperture fits around the first tube of a sprocket adapter. The (Continued)

two slotted portions fit around a set of fins of a sprocket adapter. The set of flaps couple to the sprocket adapter. A take-up rod is configured to couple with a sprocket adapter. A pet waste roll assembly comprises a sprocket adapter coupled to an end cap and a take-up rod.

14 Claims, 39 Drawing Sheets

Related U.S. Application Data which is a continuation-in-part of application No. 16/513,000, filed on Jul. 16, 2019, now Pat. No. 12,010,974, which is a continuation of application No. 16/210,938, filed on Dec. 5, 2018, now Pat. No. 11,895,981, which is a continuation of application No. 15/449,771, filed on Mar. 3, 2017, now Pat. No. 10,959,396, said application No. 16/513,000 is a continuation of application No. 15/449,771, filed on Mar. 3, 2017, now Pat. No. 10,959,396, which is a continuation-in-part of application No. 15/344,209, filed on Nov. 4, 2016, said application No. 16/210,938 is a continuation of application No. 15/344,209, filed on Nov. 4, 2016.

(60) Provisional application No. 62/820,626, filed on Mar. 19, 2019, provisional application No. 62/351,792, filed on Jun. 17, 2016, provisional application No. 62/345,500, filed on Jun. 3, 2016, provisional application No. 62/250,615, filed on Nov. 4, 2015.

(51) Int. Cl.
*B32B 3/26* (2006.01)
*B32B 5/02* (2006.01)
*B32B 27/06* (2006.01)
*B32B 27/08* (2006.01)
*B32B 27/10* (2006.01)

(52) U.S. Cl.
CPC ............. *B32B 5/022* (2013.01); *B32B 27/06* (2013.01); *B32B 27/08* (2013.01); *B32B 27/10* (2013.01); *B32B 2250/04* (2013.01); *B32B 2250/05* (2013.01); *B32B 2307/5825* (2013.01); *B32B 2307/70* (2013.01); *B32B 2307/726* (2013.01); *B32B 2307/7265* (2013.01); *B32B 2307/75* (2013.01); *B32B 2432/00* (2013.01)

(56) References Cited

U.S. PATENT DOCUMENTS

| | | | |
|---|---|---|---|
| 742,964 A | 11/1903 | Brownell | |
| 1,121,905 A | 12/1914 | Dorricott | |
| 1,630,058 A | 5/1927 | Cundey | |
| 2,099,976 A | 11/1937 | Hagendorn | |
| 2,762,580 A | 9/1956 | Scanlon | |
| 4,050,414 A | 9/1977 | Knochel et al. | |
| 5,203,516 A * | 4/1993 | Donaldson | B65H 75/14 242/118.8 |
| 5,564,996 A | 10/1996 | Sundstrom | |
| 6,119,629 A | 9/2000 | Sicchio | |
| 6,745,808 B2 * | 6/2004 | Kobayashi | B65H 37/007 156/577 |
| D498,635 S | 11/2004 | Allsopp | |
| D512,256 S | 12/2005 | Allsopp | |
| D618,028 S | 6/2010 | Di Stefano | |
| D621,105 S | 8/2010 | Askinasi | |
| D694,040 S | 11/2013 | Di Stefano | |
| D749,871 S | 2/2016 | Page et al. | |
| 9,260,912 B2 * | 2/2016 | Huang | E06B 9/322 |
| 9,902,583 B2 * | 2/2018 | Tanaka | B41J 15/04 |
| 10,091,972 B1 | 10/2018 | Jensen et al. | |
| 10,531,637 B2 | 1/2020 | Geelen | |
| 11,140,864 B2 | 10/2021 | Suchkov et al. | |
| D1,009,506 S | 1/2024 | Huang | |
| 11,895,981 B2 | 2/2024 | Cook et al. | |
| 2005/0258301 A1 * | 11/2005 | Hirte | B65H 16/04 242/597.6 |
| 2008/0169371 A1 * | 7/2008 | Sawai | B65H 75/30 242/376 |
| 2009/0241850 A1 | 10/2009 | Campbell et al. | |
| 2010/0175626 A1 | 7/2010 | Askinasi | |
| 2010/0307422 A1 | 12/2010 | Huck | |
| 2011/0185977 A1 | 8/2011 | Dixon et al. | |
| 2013/0213314 A1 | 8/2013 | Wang et al. | |
| 2014/0275824 A1 | 9/2014 | Couse | |
| 2014/0311415 A1 | 10/2014 | Tanigawa et al. | |
| 2015/0027380 A1 | 1/2015 | Sasano | |
| 2015/0150732 A1 | 6/2015 | Abir | |
| 2016/0015005 A1 | 1/2016 | Brown | |
| 2016/0021844 A1 | 1/2016 | Peterson et al. | |
| 2016/0029592 A1 | 2/2016 | Springer et al. | |
| 2016/0192620 A1 | 7/2016 | Hu et al. | |
| 2016/0302392 A1 | 10/2016 | Pantazes | |
| 2017/0173390 A1 | 6/2017 | Quy | |
| 2018/0132455 A1 | 5/2018 | Pradeep et al. | |
| 2018/0213748 A1 | 8/2018 | Eom | |
| 2018/0303065 A1 | 10/2018 | Lee | |
| 2020/0120892 A1 | 4/2020 | Suchkov et al. | |
| 2021/0207690 A1 | 7/2021 | Dods et al. | |
| 2022/0210998 A1 | 7/2022 | Cook et al. | |
| 2023/0035436 A1 | 2/2023 | Kim | |
| 2023/0035809 A1 | 2/2023 | Pease et al. | |

FOREIGN PATENT DOCUMENTS

| | | | | |
|---|---|---|---|---|
| CN | 103502778 A | | 1/2014 | |
| CN | 107517858 A | | 12/2017 | |
| CN | 108684542 A | | 10/2018 | |
| CN | 109258487 A | | 1/2019 | |
| CN | 109588339 A | | 4/2019 | |
| CN | 109729710 A | | 5/2019 | |
| CN | 307011303 | | 12/2021 | |
| DE | 3534522 A1 | | 4/1986 | |
| DE | 4120216 A1 | | 12/1992 | |
| GB | 2228241 A | | 8/1990 | |
| JP | 59133113 A | | 7/1984 | |
| JP | 3242168 B2 * | | 12/2001 | |
| JP | 2004242512 A | | 9/2004 | |
| JP | 2005040016 A | | 2/2005 | |
| JP | D1487589 | | 1/2014 | |
| JP | D1491324 | | 2/2017 | |
| JP | 2021092600 A | | 6/2021 | |
| KR | 20140074462 A | | 6/2014 | |
| KR | 20160149390 A | | 12/2016 | |
| KR | 20170102122 A | | 9/2017 | |
| KR | 102269243 B1 | | 6/2021 | |
| KR | 301236347.0000 | | 10/2023 | |
| KR | 301271201.0000 | | 8/2024 | |
| SE | 520871 | | 9/2003 | |
| TW | 201230997 A * | | 8/2012 | ......... A47K 10/3818 |
| WO | 2005093626 A2 | | 10/2005 | |
| WO | 2019044899 A1 | | 3/2019 | |

OTHER PUBLICATIONS

Replacement Rolls for The Self-Cleaning Dog Potty. BrilliantPad (online) 11 pgs. Available Sept 6, 2019. [Retrieved Sep. 16, 2022]; https:1/www.amazon.com/BrilliantPad-Replacement-Self-Cieaning-Improved-Absorbent/dp/807XKDMMTKI (Year: 2019).

Self-Cleaning, Automatic Indoor Dog Potty. BrilliantPad (online) 11 pgs. Available May 29, 2019. [Retrieved Sep. 16, 2022] https://www.amazon.com/BrilliantPad-Automatic-Self-Cieaning-Puppies-Machine/dp/B07GRGBQHG (Year:2019)

20PC X RU5-0307-000 RU5-0307 RU5-0307-000CN Drive Gear. OKLILI (online). Available Apr. 12, 2017. [Retrieved Mar. 12,

(56) References Cited

OTHER PUBLICATIONS

2024] https://www.amazon.com/O Kli LI-RU5-0307-OOO-RU5-0307-RU5-0307-OOOCN-Compatible/dp/B07SRB3WSD (Year: 2017) (3 pages).
4 1/4" x 3/8" 1/2" Bore Plastic Gear. Covertelectric (online). Available Aug. 14, 2023. [Retrieved Mar. 12, 2024] https://www.ebay.com/itm/255683437919? (Year: 2023) (4 pages).
Compatible RA0-1005-000 RC1-1753-000 FU5-0703-000 Arm Swing Gear 17T for HP 1000 1200 1300 Printer Fuser Drive Gear. v HyDeYu (online). No date available. [Retrieved Mar. 12, 2024] https://www.aliexpress.uslitem/2251832702370149.html?gatewayAdapt=glo2usa4itemAdapt#nav-description (Year: NA) (4 pages).
20PC X RU5-0307-000 RU5-0307 RU5-0307-000CN Drive Gear. OKLILI (online) 3 pgs. Available Apr. 12, 2017. [Retrieved Mar. 12, 2024] https://www.amazon.com/OKLI LI-RU5-0307-OOO-RU5-0307-RU5-0307-OOOCN-Compatible/dp/B07SRB3WSD (Year: 2017) (3 pages).
32P Hardened Pinion Gear Set, posted unknown [online], [retrieved Oct. 3, 2024]. Retrieved from internet, https://www.amazon.com/Hardened-Pinion-Compatible-Metric-Pitch/dp/807ZX22F2G?th=1 (Year: 2024) (8 pages).
4 1/4" x 3/8" 1/2" Bore Plastic Gear. Covertelectric (online) 4 pgs. Available Aug. 14, 2023. [Retrieved Mar. 12, 2024] https://www.ebay.com/itm/255683437919? (Year: 2023).
48P 76T Spur Gear, posted May 5, 2024 [online], [retrieved Oct. 3, 2024]. Retrieved from internet, https://www.amazon.com/Hardened-Transmission-Pinions-3-175m m-Stampede/dp/BOCZHY9Z9Z?th= 1 (Year: 2024) (7 pages).
Eco-Friendly Puppy Pad Rolls, posted unknown [online], [retrieved Oct. 3, 2024]. Retrieved from internet, https://www.brilliantpad.com/products/brilliantpad-eco-rolls (Year: 2024) (6 pages).
Gear and Sprocket Replacement Kit, posted Jan. 29, 2021 [online], [retrieved Oct. 3, 2024]. Retrieved from internet, https://www.amazon.com/Sprocket-Replacement-Liftmaster-Chamberlain-Craftsman/dp/808S 8W313J (Year: 2021) (10 pages).
INJORA 15g Stainless Steel, posted unknown [online], [retrieved Oct. 3, 2024]. Retrieved from internet, https://www.amazon.com/INJORA-Stainless-Steel-40-3-Transmission/dp/80C1 CTWH9X?th=1 (Year: 2024) (9 pages).
Worm Gear Kit, posted Feb. 22, 2023 [online], [retrieved Oct. 3, 2024]. Retrieved from internet, https://www.amazon.com/Compatible-KitchenAid-Whirlpooi-Replacement-W11 086780/dp/808WH MT3GF (Year: 2023) (8 pages).

\* cited by examiner

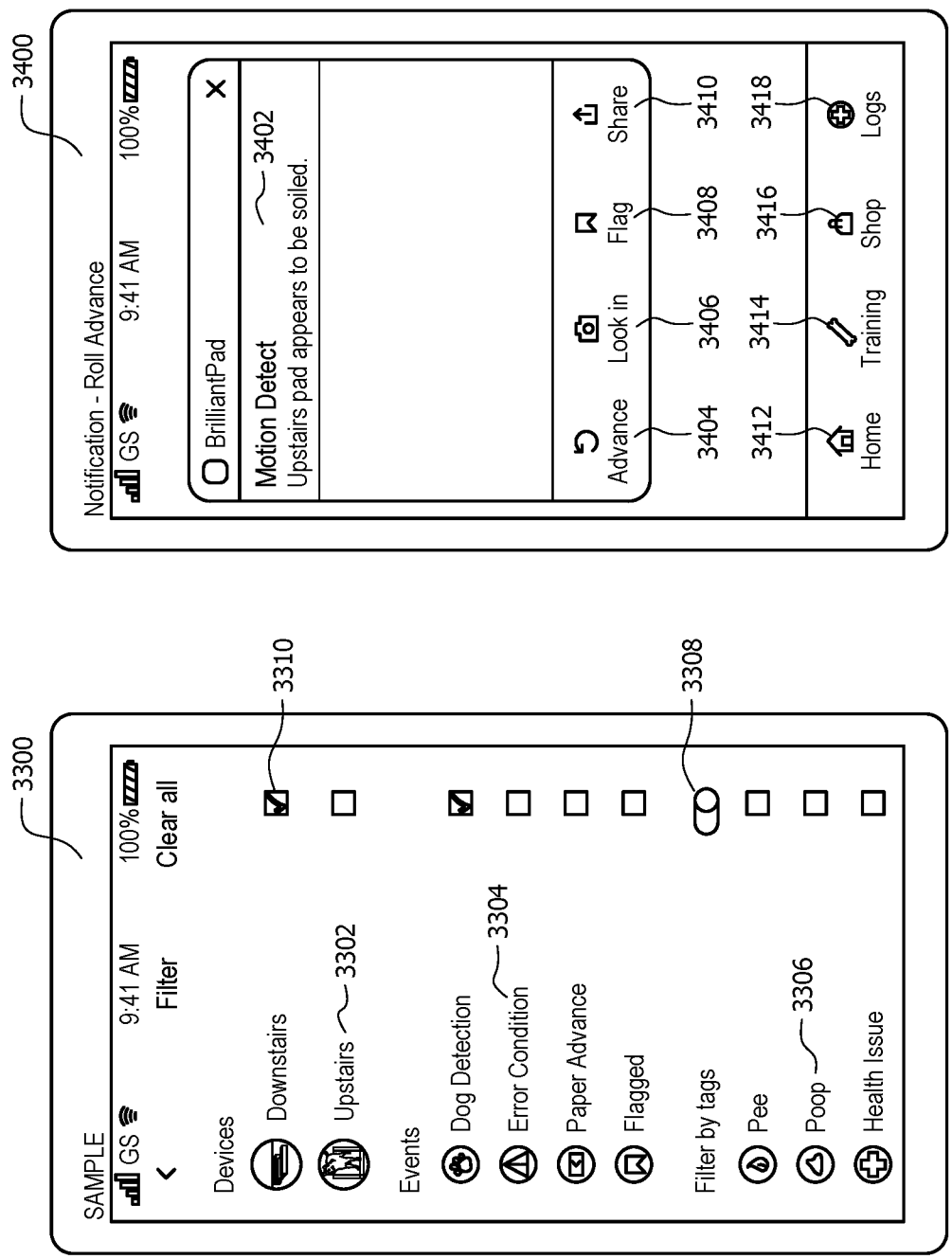

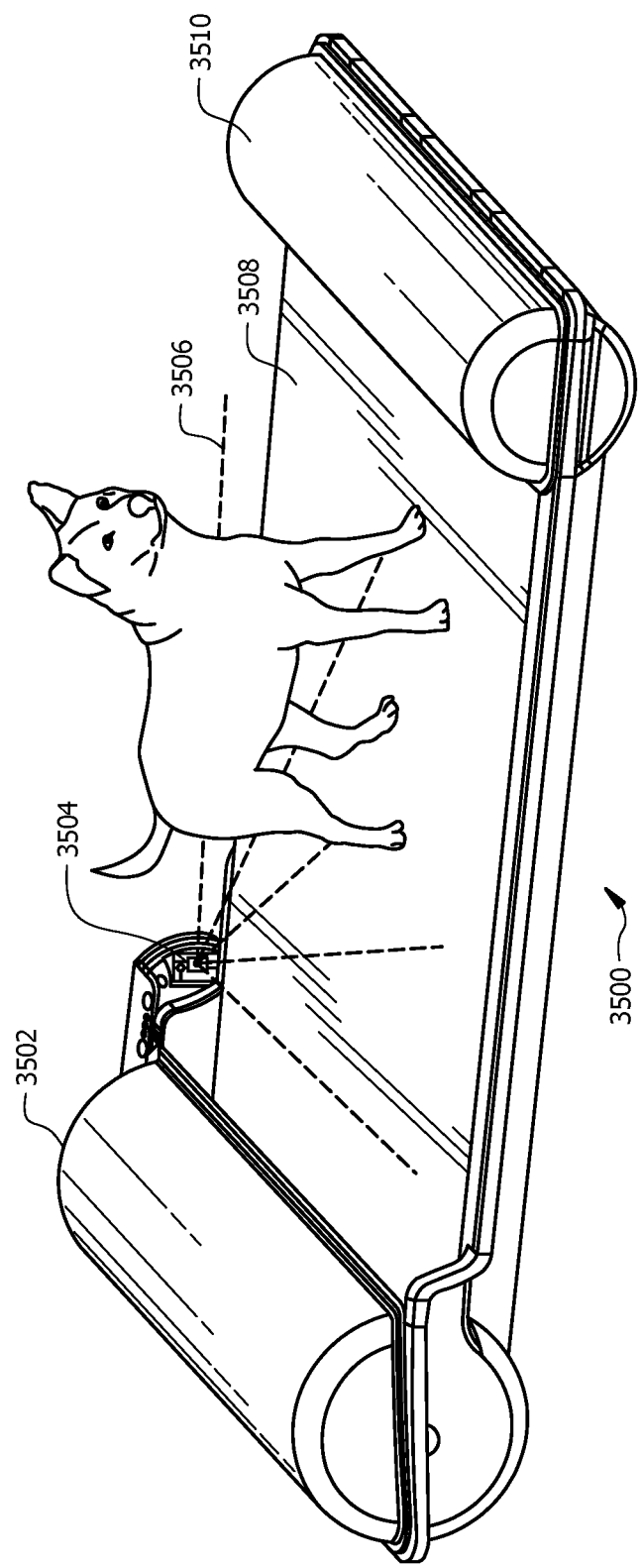

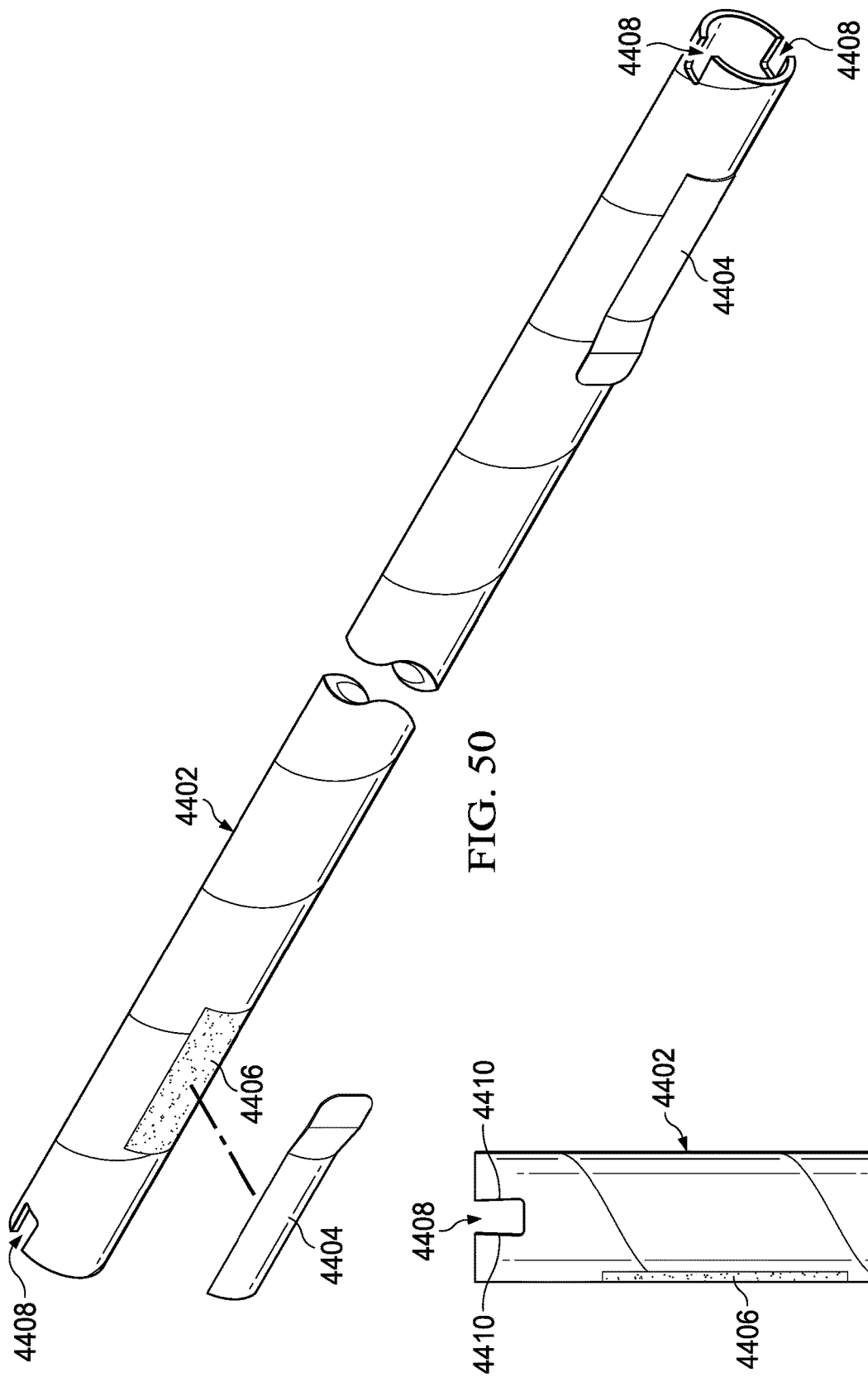

PET WASTE ROLL ASSEMBLY

CROSS-REFERENCE TO RELATED APPLICATIONS

This application, is a continuation-in-part application of co-pending U.S. patent application Ser. No. 16/698,559 filed Nov. 26, 2019, entitled "Pet Waste Apparatus, Method, and System for User Control," which claims the benefit of U.S. Provisional Application No. 62/820,626 filed Mar. 19, 2019, is a continuation-in-part application of co-pending U.S. patent application Ser. No. 16/513,000 filed Jul. 16, 2019, entitled "Markings for a Pet Waste Pad Roll," which is a continuation application of U.S. patent application Ser. No. 16/210,938 filed Dec. 5, 2018, entitled "Pet Waste Paper Markings," which is a continuation application of (1) U.S. patent application Ser. No. 15/449,771 filed Mar. 3, 2017, entitled "Automatic Dog Waste Apparatus" which is a continuation-in-part application of co-pending U.S. patent application Ser. No. 15/344,209 filed Nov. 4, 2016, entitled "Pet Waste Cartridge" and which claims the benefit of U.S. Provisional Application Nos. 62/345,500 filed Aug. 3, 2016, and 62/351,792 filed Jun. 17, 2016, and (2) U.S. patent application Ser. No. 15/344,209 filed Nov. 4, 2016, entitled "Pet Waste Cartridge" which claims the benefit of U.S. Provisional Application Nos. 62/345,500 filed Aug. 3, 2016, 62/351,792 filed Jun. 17, 2016, and 62/250,615 filed Nov. 4, 2015; U.S. patent application Ser. No. 16/513,000 filed Jul. 16, 2019, entitled "Markings for a Pet Waste Pad Roll" is also a continuation application of U.S. patent application Ser. No. 15/449,771 filed Mar. 3, 2017, entitled "Automatic Dog Waste Apparatus" which is a continuation-in-part application of co-pending U.S. patent application Ser. No. 15/344,209 filed Nov. 4, 2016, entitled "Pet Waste Cartridge" and which claims the benefit of U.S. Provisional Application Nos. 62/345,500 filed Aug. 3, 2016, and 62/351,792 filed Jun. 17, 2016, the technical disclosures of all of which are hereby incorporated by reference in their entirety.

TECHNICAL FIELD

The present disclosure relates to a sprocket adapter for a pet waste machine, an end cap for a pet waste machine, and pet waste assembly for a pet waste machine. More particularly, the present disclosure describes components configured to seal pet waste.

BACKGROUND

Self-cleaning pet waste machines are commonly used to collect and dispose animal urine and feces, which permits animals to deposit waste in a suitable area indoors and exempts pet owners from the offensive odors of the waste and the hassle of manually cleaning the waste. Typically, the self-cleaning pet waste machines are comprised of a platform configured to receive pet waste, wherein a roll of absorbent pads are extended across the platform. The roll of pads is customarily placed in a compartment at one end of the pet waste machine, pulled out over the platform, wrapped around a rod connected to an actuator, and placed in a compartment at the opposite end of the pet waste machine. When the actuator rotates the rod, the pad is advanced across the platform and rolled up into the compartment.

However, the attachment of the roll of pads to the rod in existing machines may lead to issues. For example, existing machines may require the roll of pads to be threaded through openings, which becomes a cumbersome process. Additionally, simpler designs for attachment between the roll of pads and a rod result in unsupported rollers that are attached to the rod.

Therefore, there is a need for providing a pet waste assembly that is capable of simple connection between a roll of pads and a rod without sacrificing support in the rollers that are attached to the rod.

SUMMARY OF THE DISCLOSURE

The present disclosure relates to a sprocket adapter which may be configured to wind up a waste pad around a take-up rod. The sprocket adapter includes a sprocket having a first side and a second side. A first tube is configured to extend perpendicularly from the first side of the sprocket. The first tube may comprise a set of outer couplers extending from an outer surface of the first tube configured to couple with the take-up rod. The first tube may further comprise a set of inner couplers extending from an inner surface of the first tube configured to couple with the take-up rod. A second tube is configured to extend from the first side of the sprocket and concentrically located inside of the first tube. The second tube may comprise a set of radial protrusions configured to couple with the take-up rod. The second tube may further comprise a set of radial protrusions configured to couple with the take-up rod. A set of fins is configured to extend perpendicularly from the first side of the sprocket. The set of fins may comprise at least one radial protrusion extending inward toward the first tube. The at least one radial protrusion is configured to couple with the waste pad.

In several embodiments, the present disclosure relates to an end cap, which is configured to removably couple to a sprocket adapter having a first tube, a set of fins, and a set of outer couplers. The end cap comprises an aperture having two circular portions and two slotted portions. The two circular portions are configured to fit around the first tube when the end cap is secured to the sprocket adapter. The two slotted portions are configured to fit around the set of fins when the end cap is secured to the sprocket adapter. The end cap may further comprise a set of flaps configured to couple to the set of outer couplers. Other embodiments of the present disclosure relate to a take-up rod having a set of notches configured to couple with a sprocket adapter.

Other embodiments of the present disclosure relate to a pet waste roll assembly. The pet waste roll assembly may include a set of single piece, molded sprocket adapters having a sprocket comprising a first side and a second side. A first tube is configured to extend perpendicularly from the first side of the sprocket. The first tube may comprise a set of outer couplers extending from an outer surface of the first tube configured to couple with the take-up rod. The first tube may further comprise a set of inner couplers extending from an inner surface of the first tube configured to couple with the take-up rod. A second tube is configured to extend perpendicularly from the first side of the sprocket and is concentrically located inside of the first tube. The second tube may comprise a set of radial protrusions configured to couple with the take-up rod. The second tube may further comprise a set of radial protrusions configured to couple with the take-up rod. A set of fins is configured to extend perpendicularly from the first side of the sprocket. The set of fins may comprise at least one radial protrusion extending inward toward the first tube. The at least one radial protrusion is configured to couple with the waste pad. The pet waste roll assembly may further comprise a set of end caps removably coupled to the sprocket adapter comprising. The set of end caps comprise an aperture having two circular portions and two slotted portions. The two circular portions are configured to fit around the first tube of the sprocket adapter. The two slotted portions are configured to fit around the set of fins of the sprocket adapter. The set of end caps may further comprise a set of flaps removably coupled to the set of outer couplers. The pet waste roll assembly may further comprise a take-up rod having a set of notches on at least one end of the rod. The set of notches are removably coupled to the set of inner couplers.

BRIEF DESCRIPTION OF THE DRAWINGS

Embodiments of the present disclosure are described by way of following drawings pointing out the various details to the inventive automatic or manual pad roll system. The main features and advantages of the present disclosure will be better understood with the following descriptions, claims, and drawings, where:

FIG. 33 shows one embodiment of the graphic user interface.

FIG. 34 shows another embodiment of the graphic user interface.

FIG. 35 shows another embodiment of the sensor system detecting the pet.

FIG. 50 shows a perspective view of an embodiment of a take-up rod.

FIG. 51 shows a close-up view of an embodiment of take-up rod.

DETAILED DESCRIPTION

Figure 1:
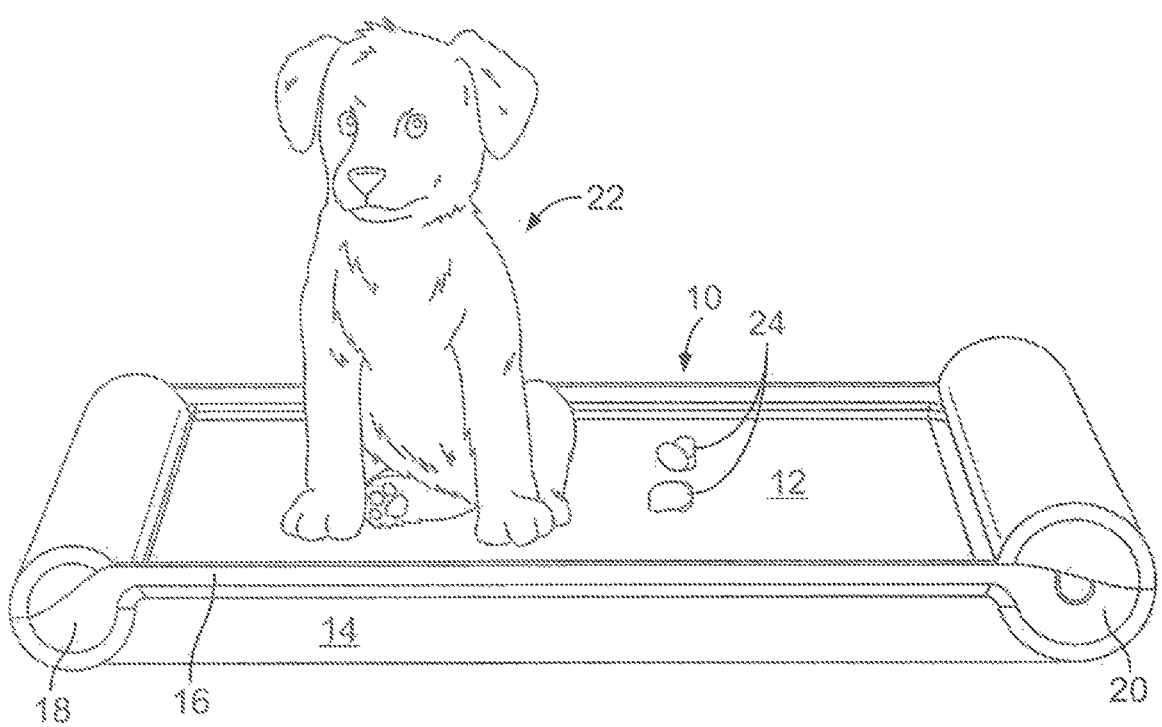
FIG. 1 shows one embodiment of the disclosure demonstrating a pet eliminating on a roll of waste pads.

As shown in FIG. 1, one embodiment of the present disclosure relates to a pet waste machine 10, alternatively referred to herein as a pet waste station 10, with a waste collection intermediary 12, alternatively referred to herein as pad supply 12. The waste collection intermediary 12 may comprise various forms such as, but not limited to, a roll of pads, folded pads, accordion sheets, cut sheets, or absorbent granular material. The pet waste machine 10 includes a flat surface 16 configured to receive pet waste 24, wherein a roll of pads 26 is disposed upon the flat surface 16. It is understood that the flat surface 16 is a generally flat surface and may be non-planar, such as being curved at different locations. A supply housing 18 for holding a fresh supply of pad rolls 26 is connected to the waste station 14. A take-up assembly 20, which is connected to an end of the pet waste machine 14, is configured to dispose soiled pads by rolling up and sealing the soiled portion of the pad. The pet waste machine 14 detects the pet waste 24 after the pet 22 enters and exits the pet waste machine 14. After the pet 22 exits the pet waste machine 14, the pad roll 26 may be advanced by removing and sealing a portion of the pad 12 into the take-up assembly 20 and feeding a clean portion of the pad roll 26 from the supply assembly 18 onto the flat surface 16.

Figure 2:
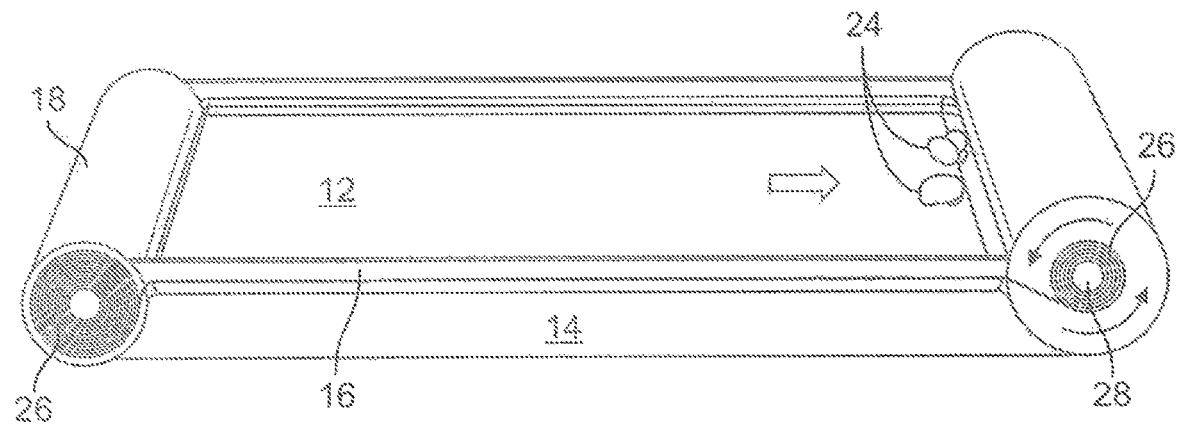
FIG. 2 shows one embodiment of the disclosure demonstrating the pet waste machine advancing a soiled pad.
Figure 3:
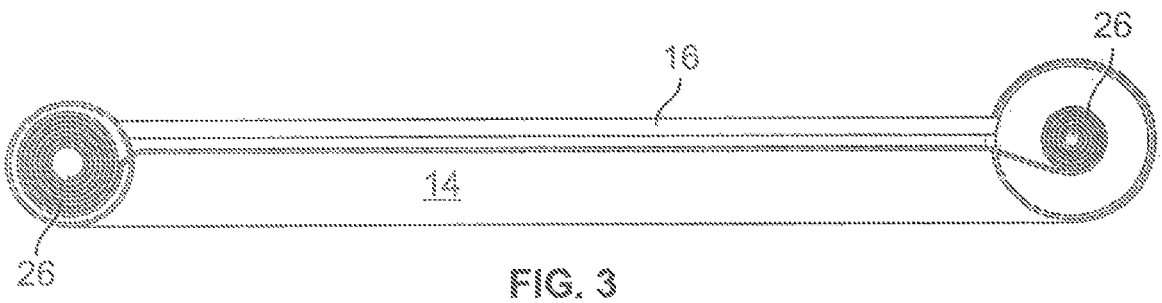
FIG. 3 shows one embodiment of the disclosure demonstrating a profile view of the pet waste machine.
Figure 8:
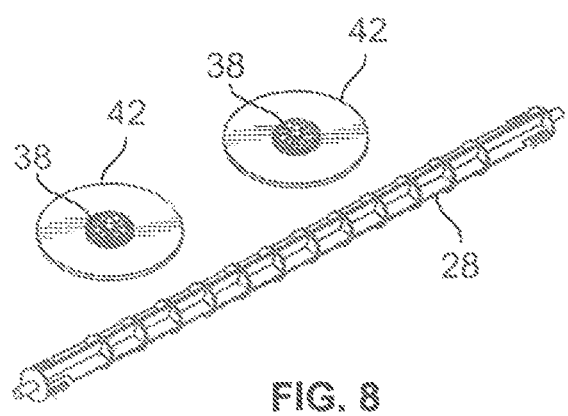
FIG. 8 shows one embodiment of the components of the take-up rod and end caps.

In another embodiment of the present disclosure, the pet waste machine is configured to have a stage interval, as shown in FIG. 1, where the pet 22 discharges waste 24 on the exposed portion of the pad 12. The stage interval is followed by a repository interval, as shown in FIG. 2, wherein the pet waste machine 14 advances the pad 12 containing waste 24 into the take-up assembly 28. The take-up assembly 28 comprises, as shown in FIG. 8, a take-up rod or core 28 and end caps 42, which are affixed to the ends of the core 28. The core 28 rotates in a counter-clockwise direction, which rolls the pad 12 around the core 28 and seals it within the take-up assembly 20 for disposal.

Figure 4:
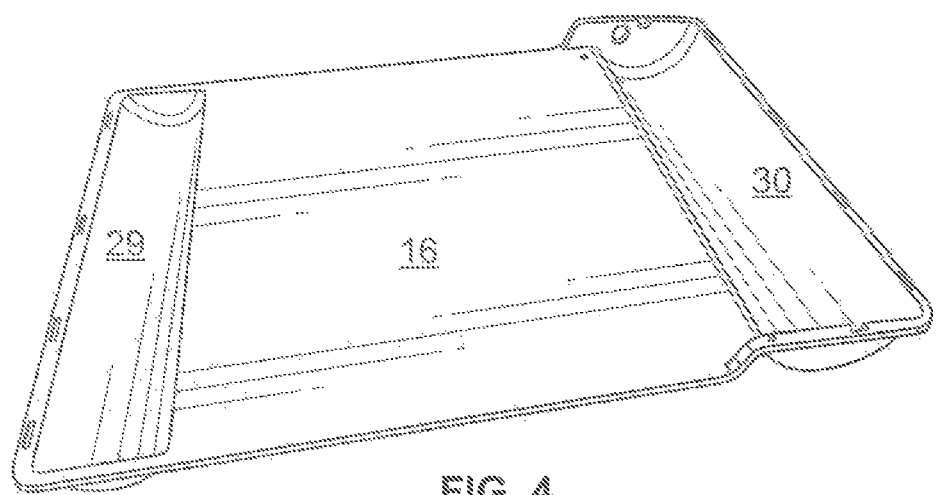
FIG. 4 shows one embodiment of the disclosure demonstrating the platform and lower portions of the pad roll assemblies.
Figure 5:
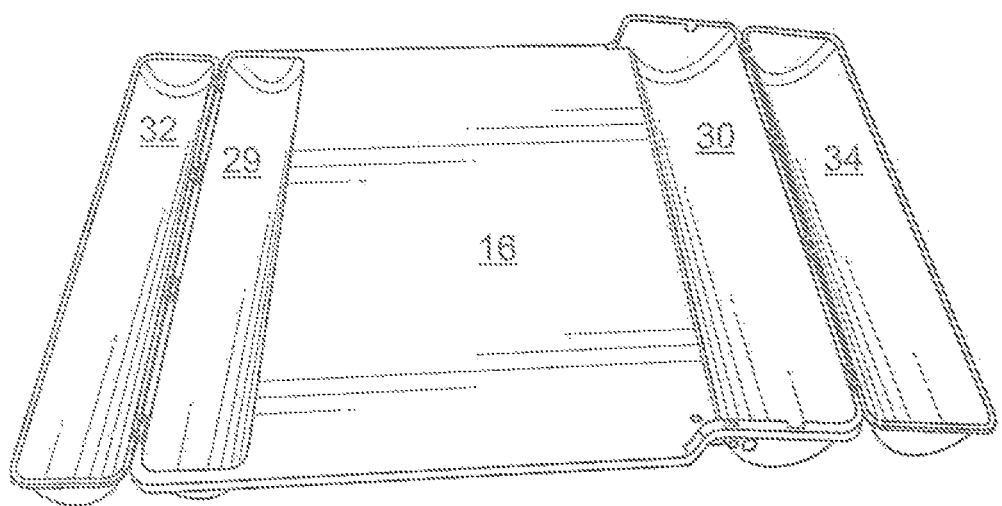
FIG. 5 shows one embodiment of the disclosure demonstrating the rotatable covers to the pad roll assemblies.

In one embodiment of the present disclosure, as shown in FIGS. 4 and 5, the structure of the take-up assembly 20 and supply housing 18 is comprised of a lower cylindrical portion 30 and 29, respectively, that is connected by a hinge to a rotatable cover 34 and 32, respectively. Similarly, the outer structure of the supply assembly 18 is comprised of a lower cylindrical portion 29 that is connected by a hinge to a rotatable cover 32.

The pad roll 26, when housed within the supply assembly 18 has its axis located below the flat surface 16 and the waste pad portion 12 is stretched across the bed 16 to the core 28, which is also located below the flat surface 16. This configuration, as depicted in FIGS. 1, 2, 3, and 26, creates sufficient friction and tension across the outstretched waste pad 12 and avoids jamming or hampering the take-up of the soiled portions of the pad roll 26 within the take-up assembly 20. Furthermore, this configuration enables the soiled pad 12 to be wrapped up into the take-up assembly 20 without contacting other parts of the pet waste machine 10, ensuring a sanitary environment. Additionally, the tension and friction across the outstretched pad 12 is further increased by closing the covers 32 and 34 over the supply and take-up assemblies.

Figure 27:
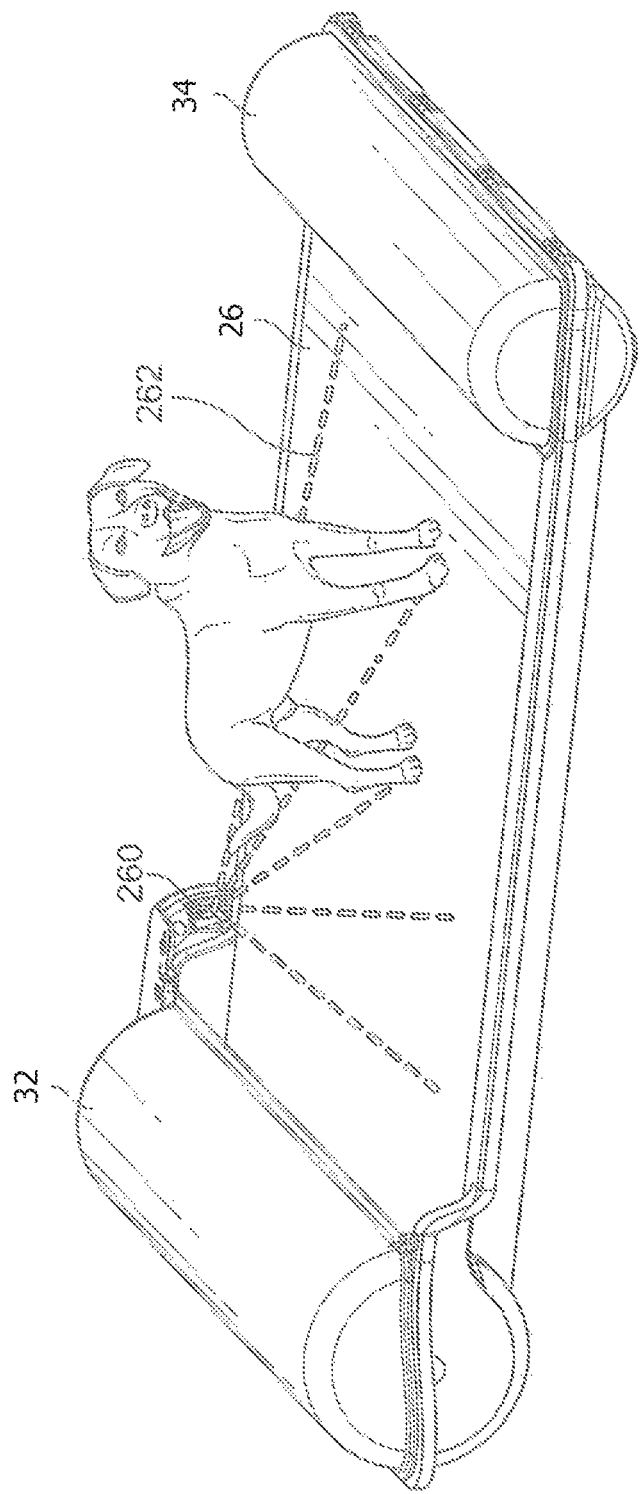
FIG. 27 shows one embodiment of the sensor system detecting a pet.
Figure 31:
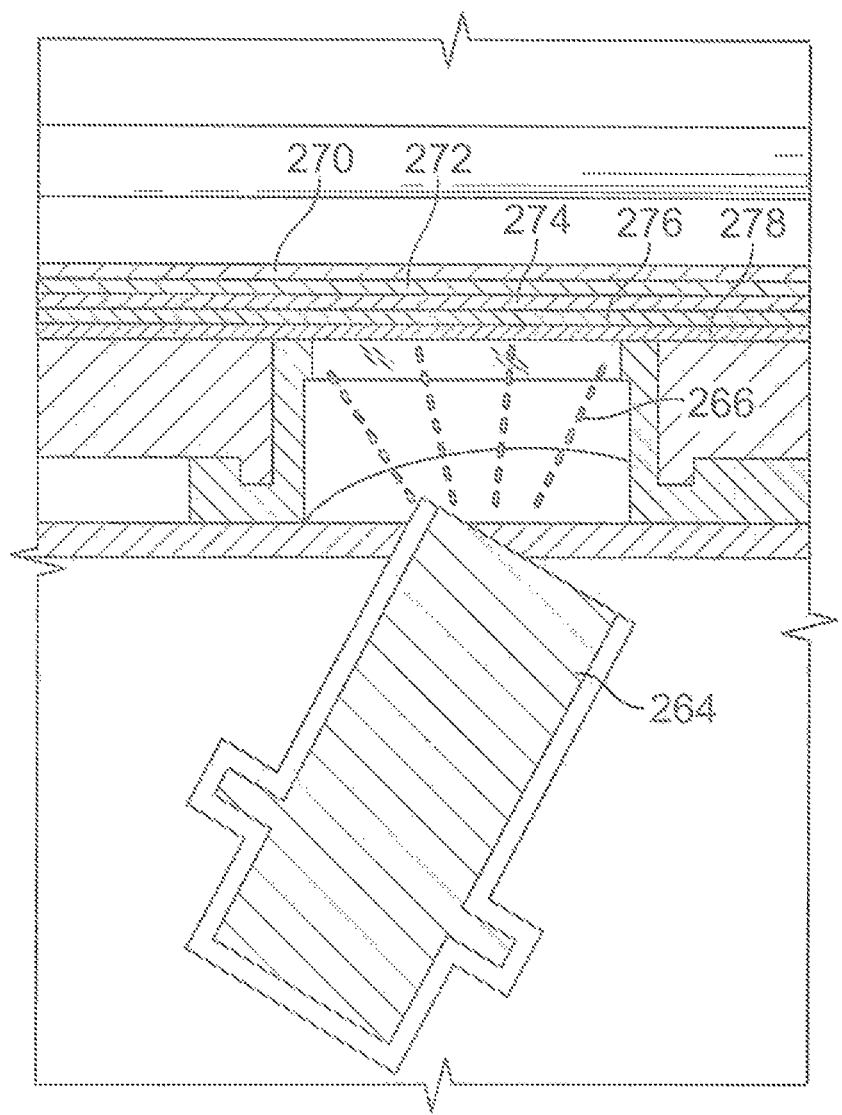
FIG. 31 shows one embodiment of the waste pad.

In one embodiment of the present disclosure, a pad roll 26 is used to absorb the pet waste, as shown in FIG. 27. In one embodiment, the pad roll comprises an absorbent front side material on a roll of pads and a nonabsorbent back side material on the roll of pads. In another embodiment, as shown in FIG. 31, the waste pad includes a non-woven spun bond 270 on the top layer 272 for tear resistance, an absorption middle layer 274, a bottom layer 276, and a plastic non-absorbent bottom layer 278 for leak protection from the liquid and solid waste. Additionally, the absorption middle layer 274 may comprise a super absorbent polymer affixed between top and bottom layers 272 and 276, respectively. The pet pad 12 may also include an air laid paper top layer allowing the removal of other layers.

The pet pad 12 may be configured to include two, three, four, or five layer construction with the mixing of absorbent and non-absorbent or non-permeable layers. The pet pad 12 may also be configured to have a single layer with absorbent and non-absorbent on opposing sides of the single layer.

Figure 9:
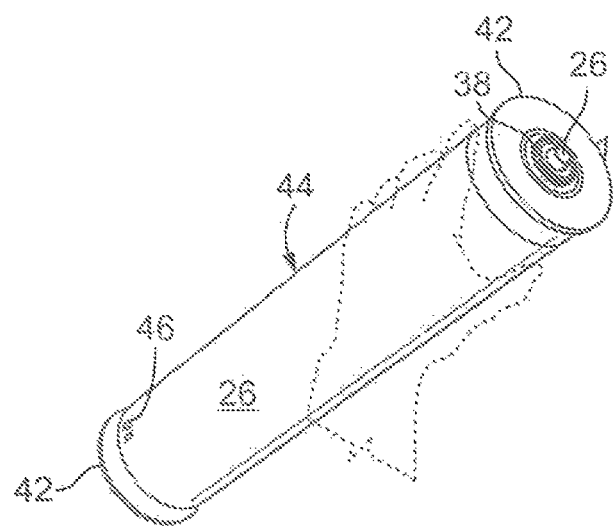
FIG. 9 shows one embodiment of a waste cartridge ready for disposal.

FIGS. 8-9 illustrate an embodiment of a waste cartridge 44. In one aspect, the waste cartridge 44 is comprised of a pad 26 rolled around a core 28, which is secured by end caps 42 affixed to the ends of the core 28. The end cap 42 often includes a gear 38 to mesh with the teeth on the corresponding gear 38 connected to a removable control and drive module 36, alternatively referred to herein as a control module 36. The control and drive module 36 is key fitted with a pair of guide pins 40 to the side of the take-up assembly 20 where the gear 38 extends through one side of the take-up assembly to engage the identical meshing teeth on the gear 38 on the end cap 42, allowing the core 28 to rotate in a counterclockwise direction, as shown in FIG. 2.

Figure 19:
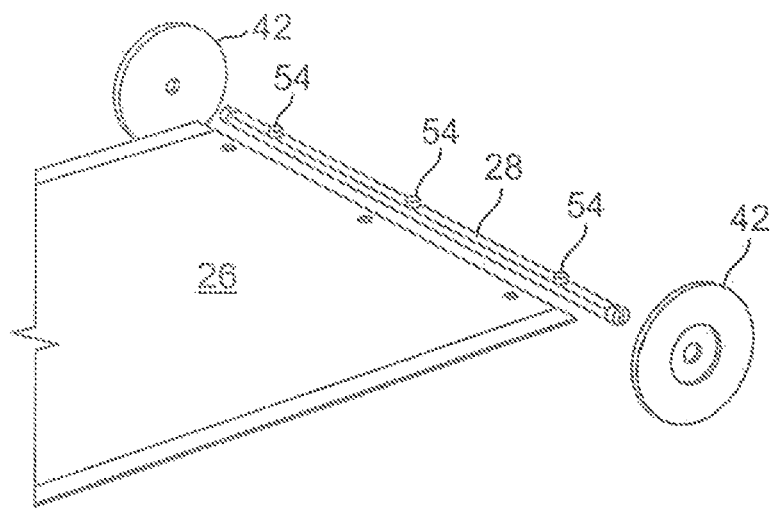
FIG. 19 shows another embodiment of attaching the pad to the take-up rod.
Figure 24:
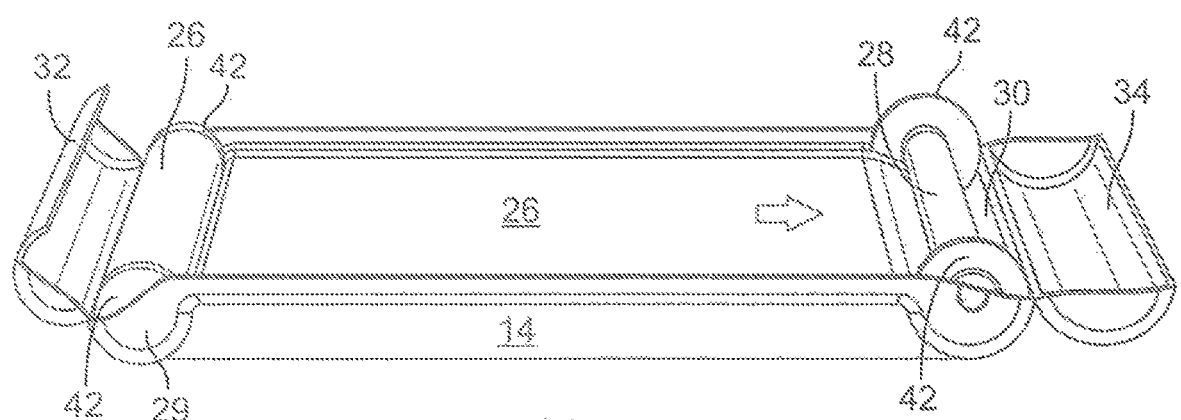
FIG. 24 show one embodiment of an installed waste cartridge.
Figure 25:
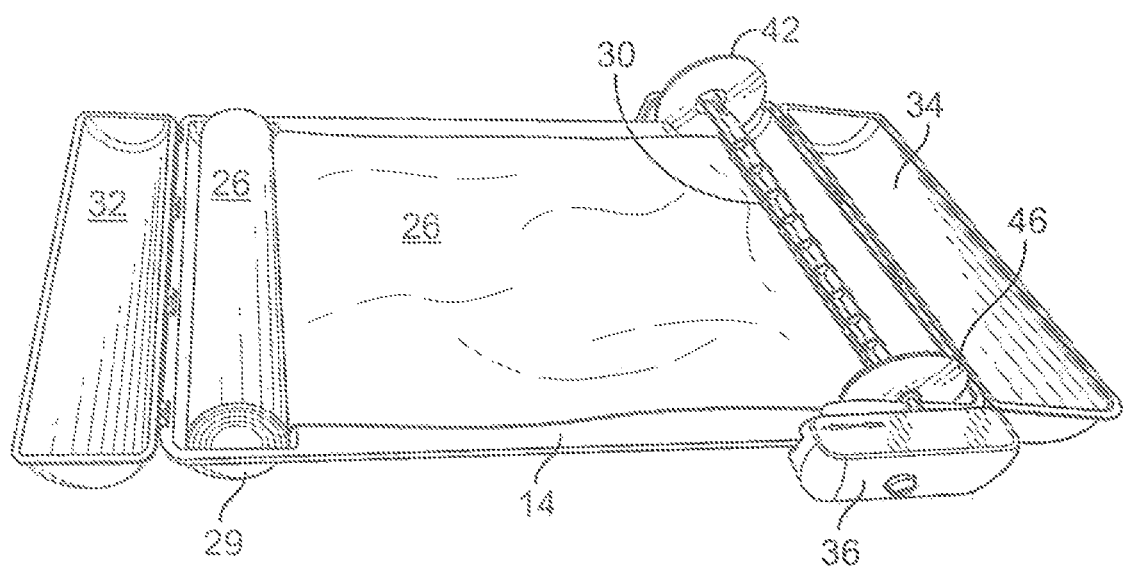
FIG. 25 shows another embodiment of an installed waste cartridge.
Figure 26:
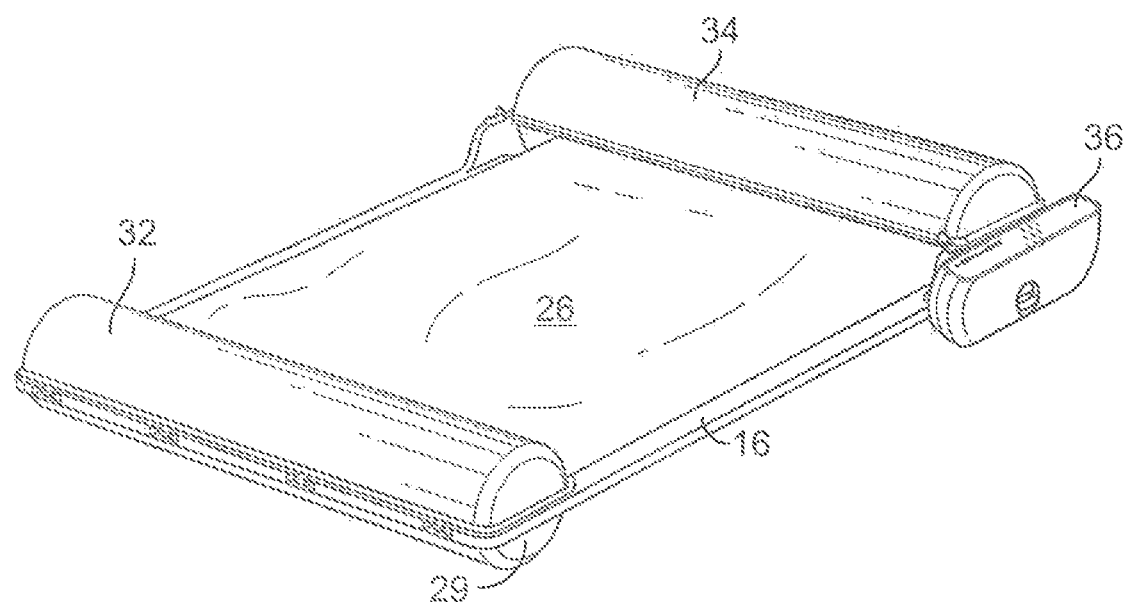
FIG. 26 shows one embodiment of the pet waste machine configured for operation.

As depicted in FIG. 19, the pad roll 26 is connected to the core 28 by pins 54 on the core 28 that are press fitted through holes in the pad 26. Alternatively, the pad roll 26 may be configured to connect to the core 28 by an adhesive material or device such as, but not limited to, tape, hook-and-loop fasteners, or snap fasteners. FIGS. 9 and 24 illustrate one end of the pad roll 26 is capable of being fed through a slot in the core 28, wherein the pad 26 is installed in the lower cylindrical portion of the supply housing 29. As depicted in FIGS. 1, 2, 3, 24, 25, and 26, the other end of the pad 26 is inserted through a slot on the core 28 and inserted into the lower cylindrical portion 30 of the take-up assembly 30, wherein the lower cylindrical covers 32 and 34 of the supply housing 18 and take-up assembly 20 are closed and a portion of the pad 12 is stretched across the bed.

Figure 10:
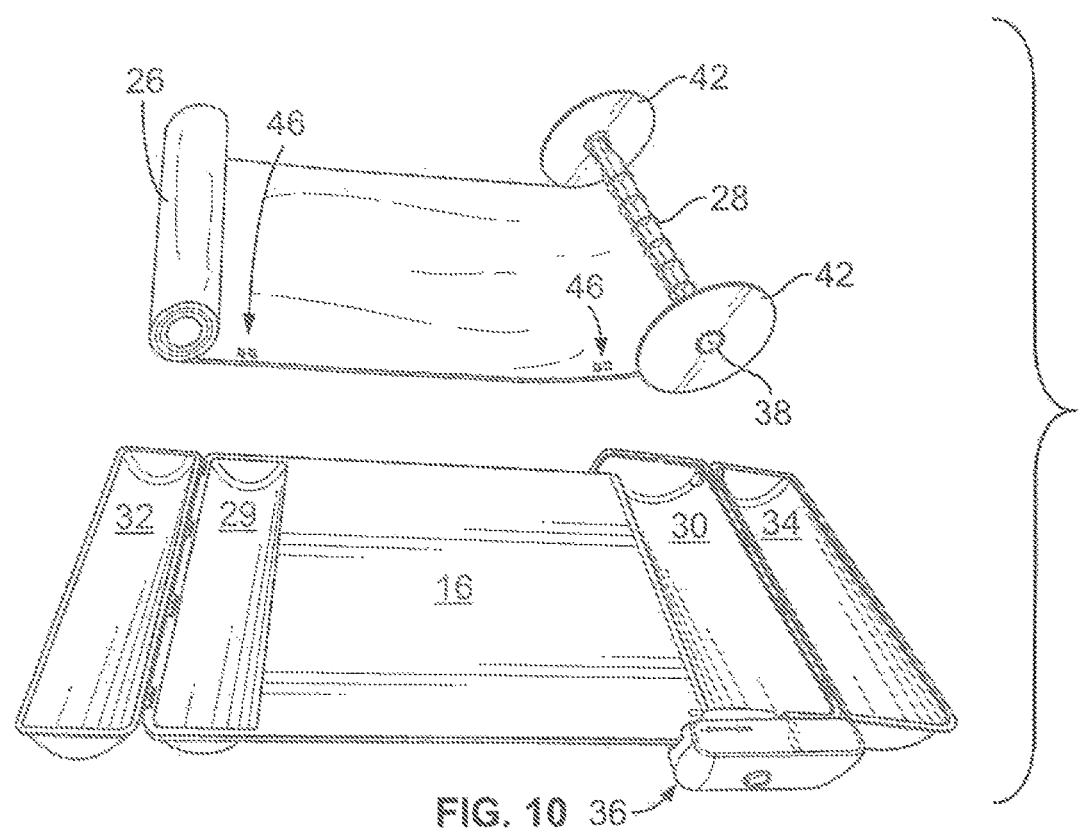
FIG. 10 shows one embodiment of installing the pad roll into the waste machine.
Figure 11:
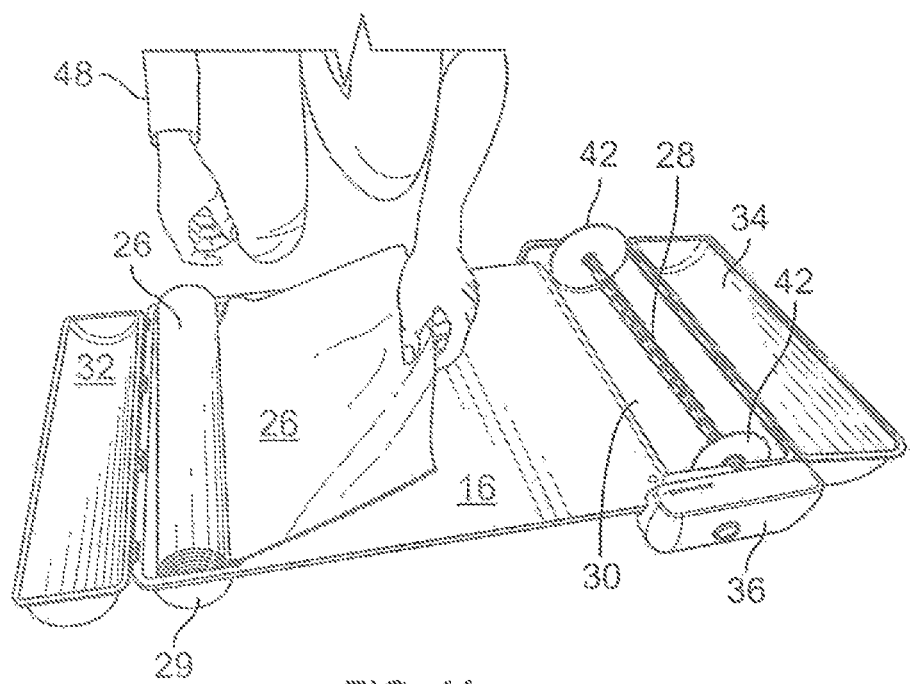
FIG. 11 shows one embodiment of installing the waste pad on the pet waste machine.
Figure 12:
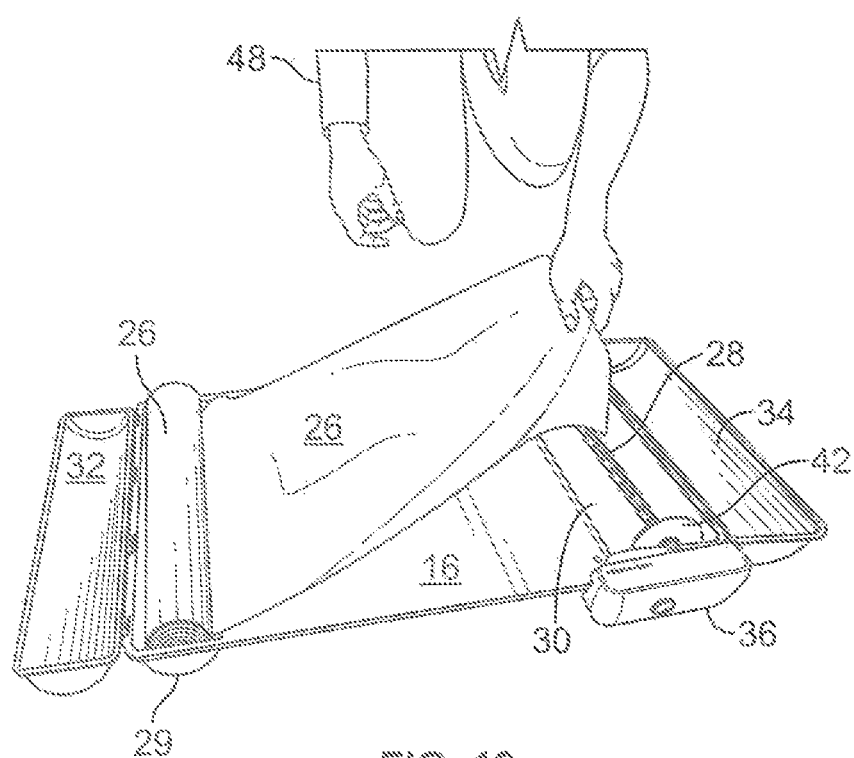
FIG. 12 shows another embodiment of installing the waste pad on the pet waste machine.
Figure 13:
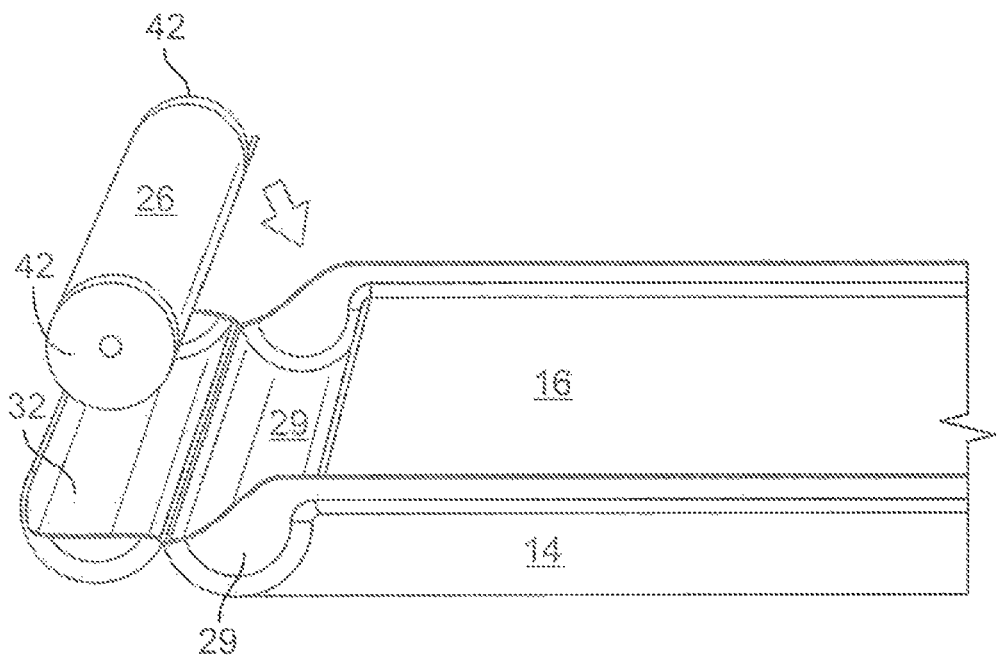
FIG. 13 shows one embodiment of inserting a pad roll into the supply assembly.
Figure 14:
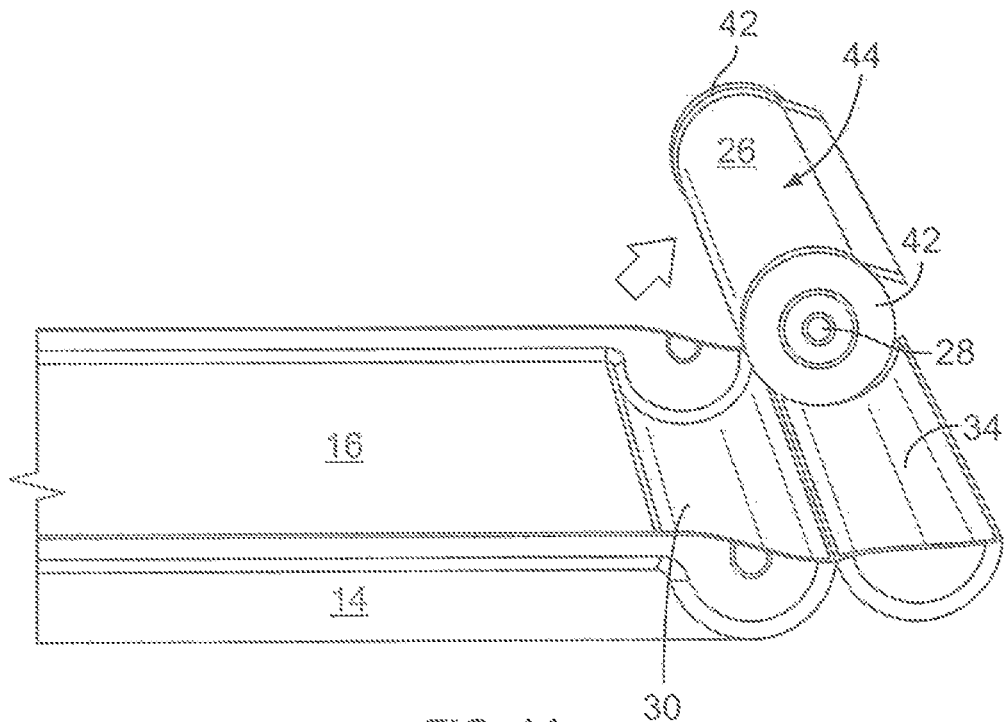
FIG. 14 shows one embodiment of removing the waste cartridge from the take-up assembly.
Figure 15:
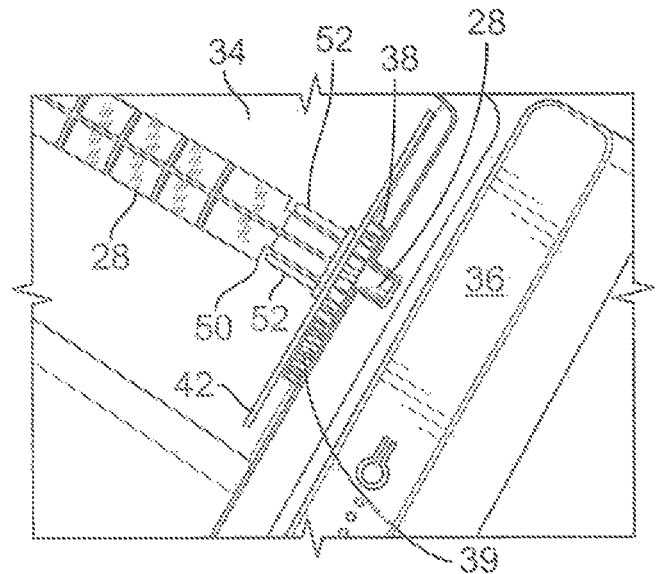
FIG. 15 shows one embodiment of the gearing and drive attachment in the take-up assembly.
Figure 16:
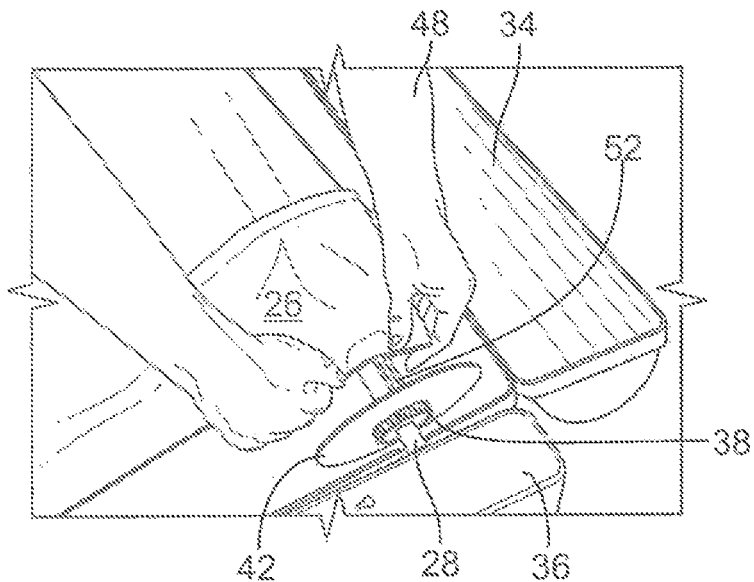
FIG. 16 shows another embodiment of the gearing and drive attachment in the take-up assembly.
Figure 17:
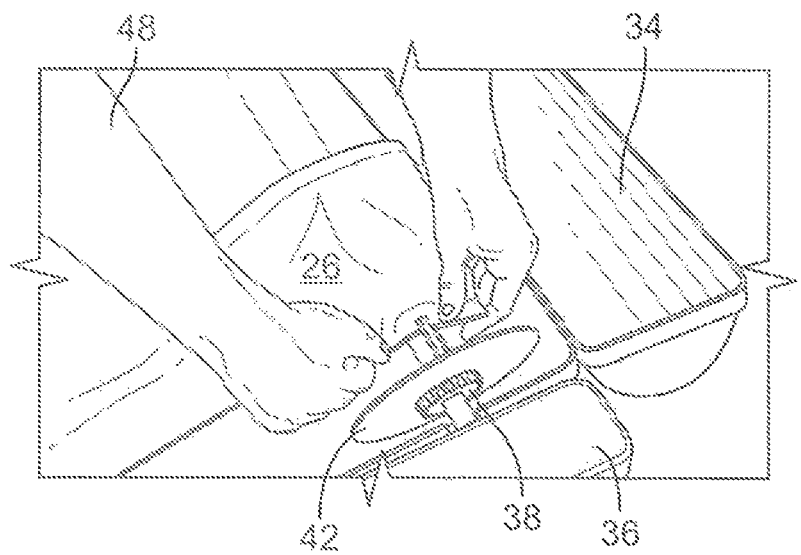
FIG. 17 shows one embodiment of attaching the pad to the take-up rod.
Figure 30:
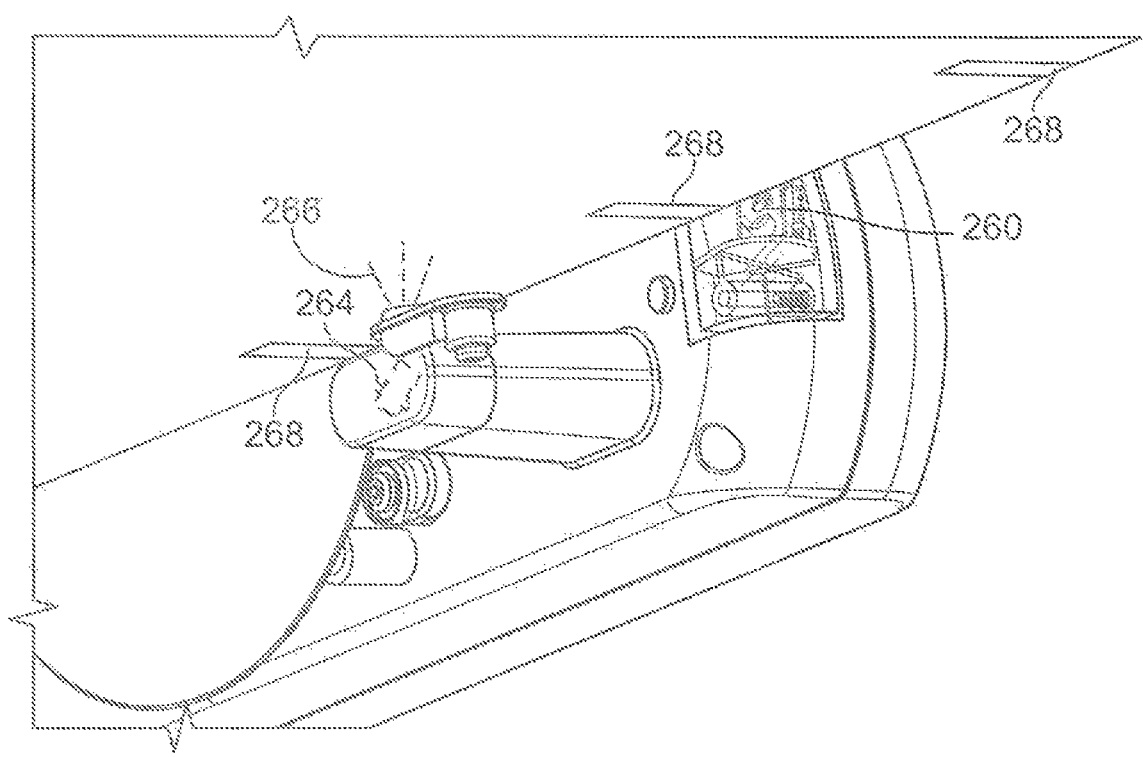
FIG. 30 shows another embodiment of the sensor system of the control and drive module.

FIGS. 9, 10, and 30 illustrate marks 46 that may be positioned on the edges of the pad 12 to enable the pet waste machine 14 to read and provide information concerning the orientation of the marks 46. For example, the markings 46 on the pad 12 enable the machine to ascertain and report the amount of fresh pad remaining on a roll. Alternatively, the markings 46 on the pad 12 may enable the user interface to advance the pad 12 a certain distance.

FIGS. 11-18 depict embodiments of a pet owner 48 installing the pad 12 on the core 28. Installation may be achieved by stretching the pad 12 from the pad roll 26 across the flat surface 16 to the core 28, wherein clips 52 at one end of the core 28 and a nib 50 provide friction against the pad 26. The nib 50, providing friction on the pad 12, ensures that the pad 12 does not slip off the clips 52 during the counterclockwise turns of the rod within the housing of take-up assembly 20.

Figure 20:
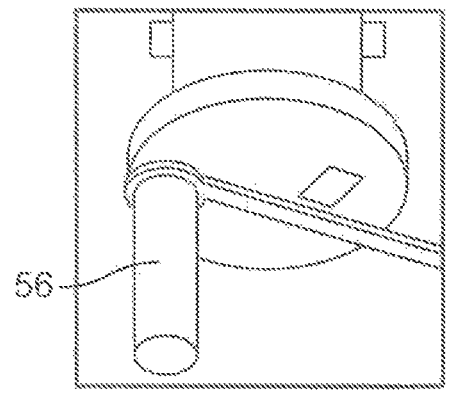
FIG. 20 shows one embodiment of a hand crank.
Figure 21:
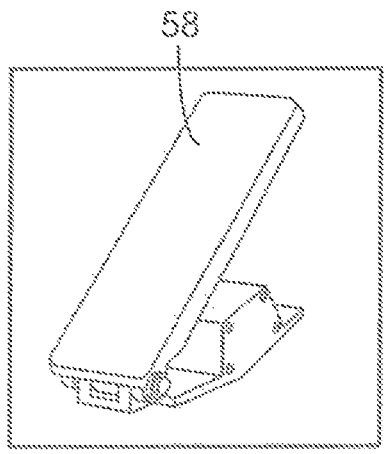
FIG. 21 shows one embodiment of a foot treadle.
Figure 22:
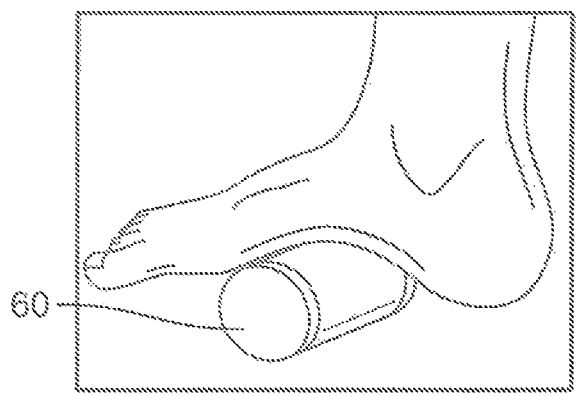
FIG. 22 shows one embodiment of a foot roll.
Figure 23:
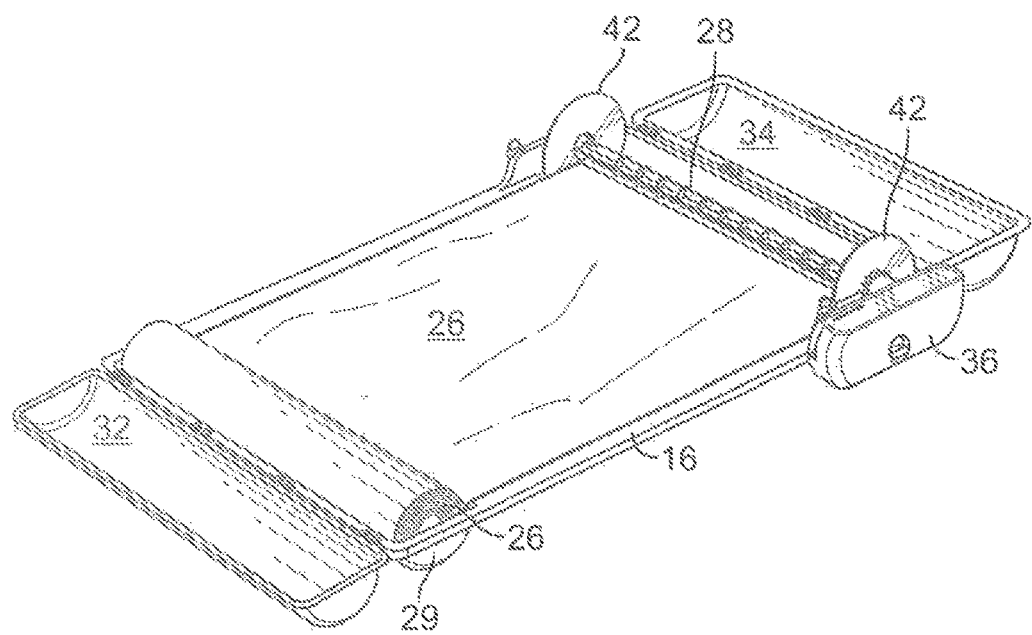
FIG. 23 shows another embodiment of installing the waste cartridge.

FIGS. 20-22 illustrate embodiments of how the pad may be manually advanced across the flat surface 16. In one embodiment, a hand crank 56 is mechanically connected to the core 28 to advance the soiled pad 12. In another embodiment, a soiled pad 12 may be advanced by the user 48 stepping on a treadle 58. As depicted in FIG. 22, a foot roll 60 is mechanically connected to the core 28 to advance the pad after the pet 22 discharges waste on the pad 12.

Figure 6:
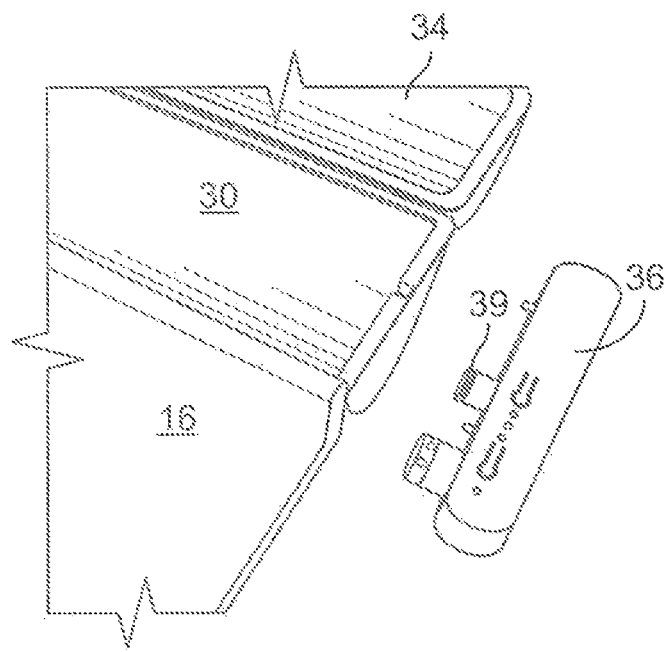
FIG. 6 shows one embodiment of the control and drive module connecting to the take-up assembly.
Figure 7:
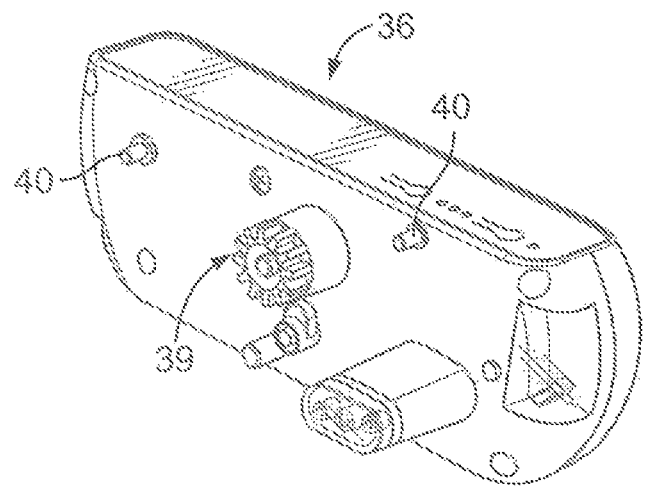
FIG. 7 shows one embodiment of the control and drive module.
Figure 18:
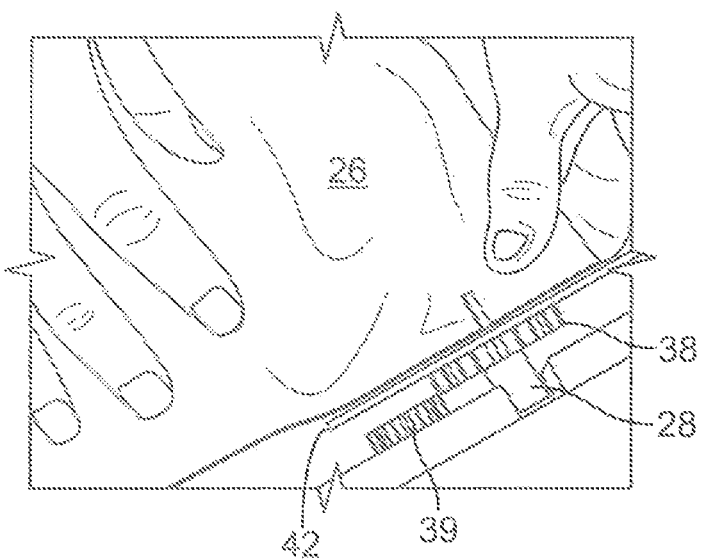
FIG. 18 shows one embodiment of the meshing of gears between the control and drive module and the take-up rod.

In one embodiment, the control and drive module 36 is connected to the pet waste machine 10 and is configured to detect animal activity. FIG. 18 shows the meshing of identical tooth gears on the end cap 38 and gear drive 39 on the removable control and drive module 36 during installation of the take-up rod 28 in the take-up assembly 20. FIGS. 6 and 7 show the removable control and drive module 36 that is used to control the movement of the pad 12 across the flat surface 16 of the machine 14.

Figure 38:
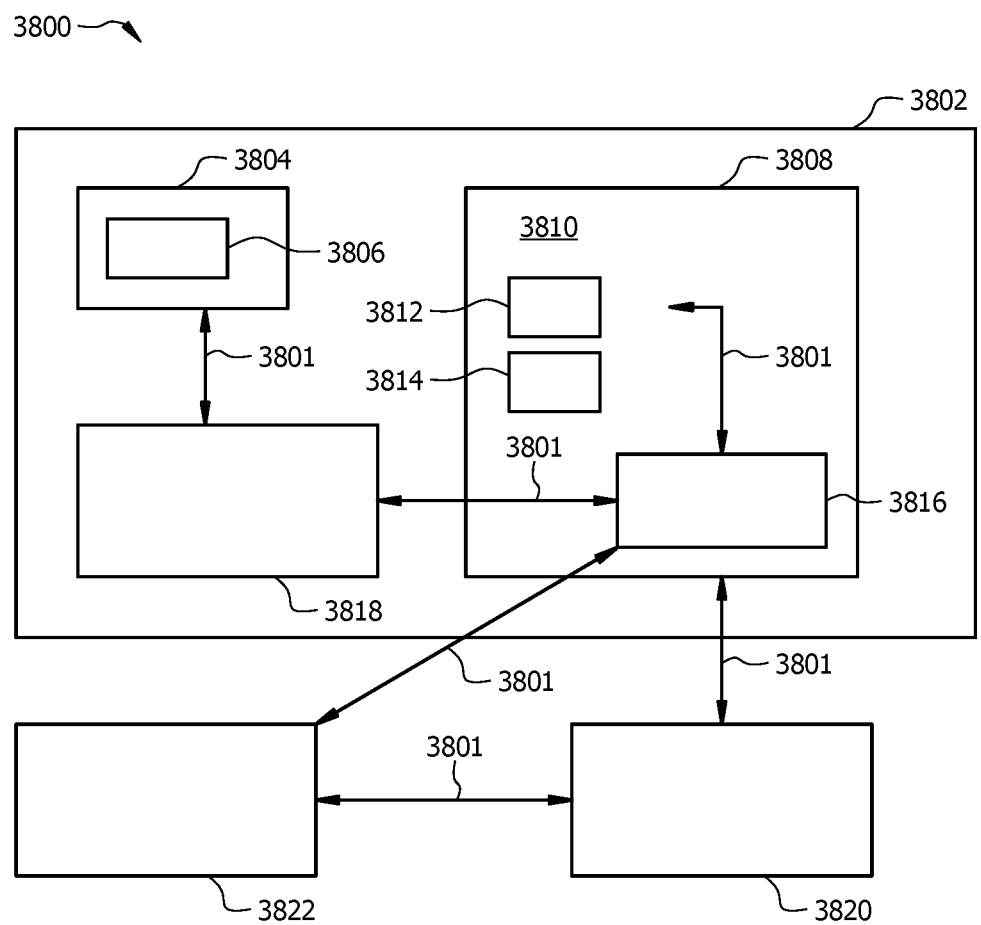
FIG. 38 shows one embodiment of the pet waste machine system.

The control module 36 may be comprised of a sensor system. In some embodiments, as shown in FIG. 38, the sensor system 3810 may include at least one activity sensor 3812, camera 3814, or weight sensing device 3818. The activity sensors 3812 may include any power transmitting sensor known in the art such as, for example, motion sensors or proximity sensors. Additionally, the sensor system 3810 may be configured to include different types activity sensors 3812 such as, for example, infrared sensors and magnetic sensors. FIGS. 27-30 show the sensor system 261 capturing information on the pet waste machine 10. In one embodiment, the activity sensor 260 in the sensor system 261 may be configured to capture the presence of the pet 22 through motion detection 262. Motion detection may be achieved through infrared detection or optical detection. Cameras 3814 included in the sensor system 3810 may be capable of capturing photographs and video. Furthermore, the cameras 3814 may be configured to operate in a nighttime infrared mode to capture images or videos when the sensor system 3810 is in the dark. Additionally, the weight sensing device 3818 may be configured to capture the mass of objects present on the flat surface 3804. The sensor system 3810 may also be configured to detect objects for an extended period of time ('persistent detection"), which may prompt an error notification for the machine. The time intervals for persistent detection may include, but are not limited to, 5 minutes, 10 minutes, and 15 minutes. For example, an animal remaining on the flat surface for a prolonged period of time would be considered abnormal, which would prompt a notification to the user interface to investigate the flat surface either by reviewing an image or physically inspecting the flat surface. Alternatively, placing the pet waste machine to close to an object may result in the sensor detecting the object and prompting an error notification. In another embodiment, the pet system 3800 may be configured where the control module 3808 is not coupled to the pet waste machine 3802. Accordingly, the control module 3808 operates remotely from the pet waste machine 3802 and is in direct or wireless communication with the pet waste machine 3802 and the server 3822. In remote embodiments, the control module 3808 retains the same functionality except for the drive mechanics, which remain in the pet waste machine 3802. For example, the control module 3808 in one embodiment is a stand-alone device with a camera 3814 and sensor 3812 located independently from the pet waste machine 3802. In a further embodiment, the pet system 3800 may comprise a pad 3806, control module 3808, server 3822, and user interface 3820. This embodiment allows greater portability for a user because the pet waste machine 3802 is no longer required.

The weight sensing 3818 device may be affixed to the bottom of the flat surface, embedded in the flat surface, or connected in other means known in the art. It should be understood that any suitable weighing scale may be utilized, such as, for example, mechanical scales or digital scales. The weight sensing device 3818 may be configured to record the weight of the pet and log each weighing on the server 3822. The pet waste machine 3802 may also be configured to notify the user interface 3820 when the pet weight fluctuates outside of a predetermined value.

Figure 36:
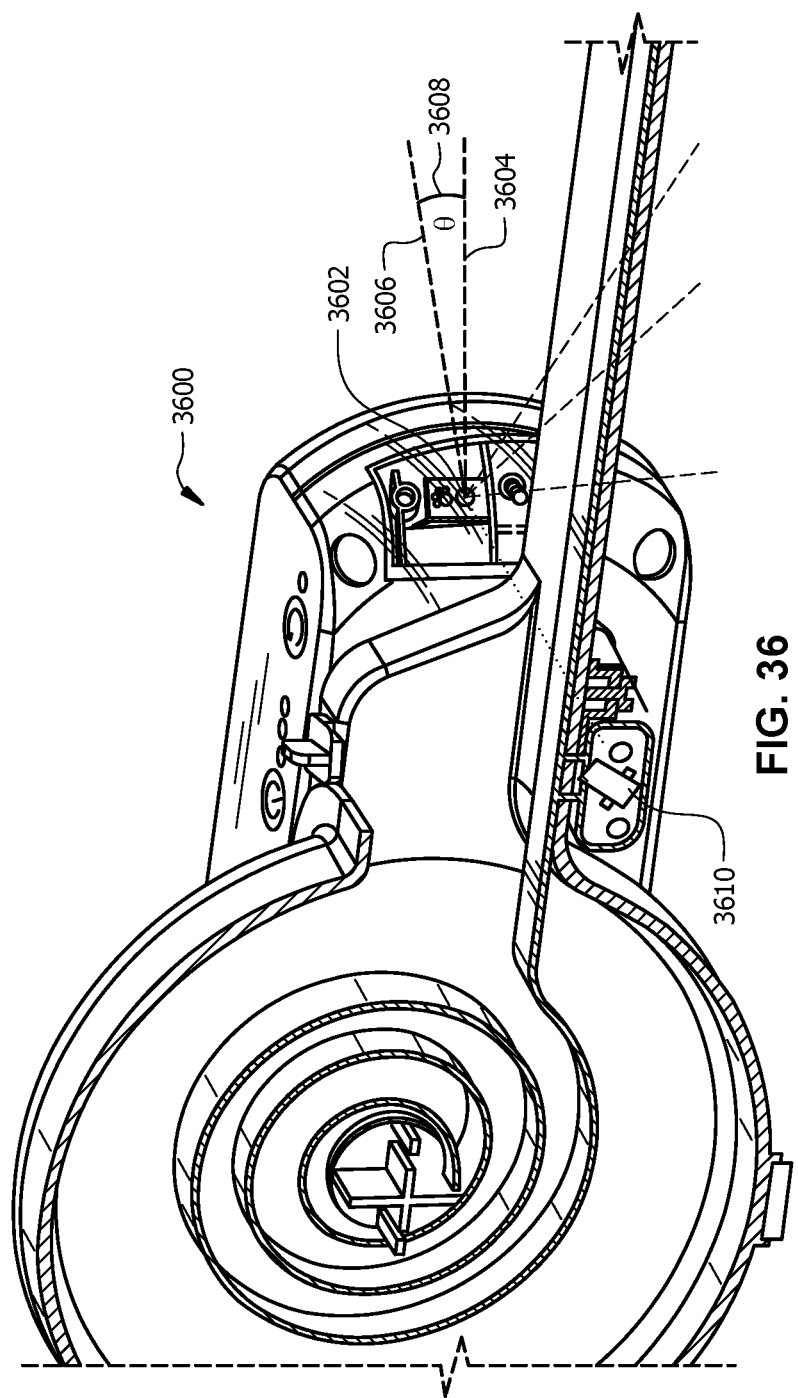
FIG. 36 shows another embodiment of the sensor system of the control and drive module.

In another embodiment, the sensor system 3600, as shown in FIG. 36, may comprise an activity sensor 3602 angled 3608 from about 45° below the horizontal 3604 to about 45° above the horizontal 3604, preferably between 5° and 15° above the horizontal 3604. The positive angle 3606 of the sensor avoids false-positive detections due to reflections from the flat surface and objects surrounding the flat surface. Alternatively, the activity sensor and camera may be placed at a higher position than the activity sensor placement shown in FIG. 35. The raised elevation enables the sensor to avoid false-positive detections due to reflections from the flat surface.

The sensor system may also comprise a lower sensor 3610. In one embodiment, the lower sensor is a motion sensor, which may be either an infrared sensor or an optical sensor. An embodiment 3500 where the activity sensor 3504 located above the horizontal of the pad 3508 is further depicted in FIG. 35. Also shown is the supply housing 3510 and take-up assembly 3502. The sensor 3504 transmits, for example, infrared transmissions 3506 across the pad 3508 to detect a pet on the pad 3506.

As depicted in FIG. 34, the graphic user interface 3400 is embedded with software that enables the user interface to manage the operation of the machine 14. In one embodiment, the graphic user interface 3400 displays a notification 3402 and action icons 3404, 3406, 3408, 3410, 3412, 3414, 3416, and 3418. In one embodiment, the user interface determines the length of the pad to advance (partial advance, half advance, or full advance) based on the markings on the pad. For example, a full sheet on a pad may be comprised of 5 marks; therefore, the user interface may select an advancement of 0-5 marks in the app, which correspondingly advances the pad. Furthermore, the user interface may program timers in the server or machine to advance the pad.

In another embodiment, the server may be configured to detect errors in the pet machine operation and notify the user interface. For example, when the server detects the pad supply in the pet waste machine is exhausted, the server will send an error notification to the user interface that the pad supply has run out. In another example, the server also may be configured to send an error notification to the user interface when a motor issue is detected. For example, the motor may be rated to operate at predefined current range. If the current supplied to the motor falls outside of the current range, an error notification related to a motor issue will be triggered. In some embodiments, the server may be configured to cease operation of the pet waste machine upon detecting an error with the machine. Additionally, the user interface may be configured to clear the error after reviewing the notification, which allows the pet waste machine to resume operation.

Users also have the ability to select the size of the machine, size of the pad, and length of the roll. In some embodiments, the pet waste machine may be configured to be expandable by disengaging extendable sections of the pet waste machine and pulling them out. Accordingly, the size of the pad increases with the expansion of the pet waste machine. In one embodiment, the pet waste machine may be extendable or contractable, giving the machine three possible sizes: small, regular, or large. The size of a full sheet of pad supply corresponding to these pet waste machine sizes may be 3 marks, 5 marks, or 7 marks, respectively. It should be understood that the size of the machine may be further expanded or contracted. It should also be understood that the size of the pad supply may vary and, accordingly, so may the threshold value of marks.

Figure 28:
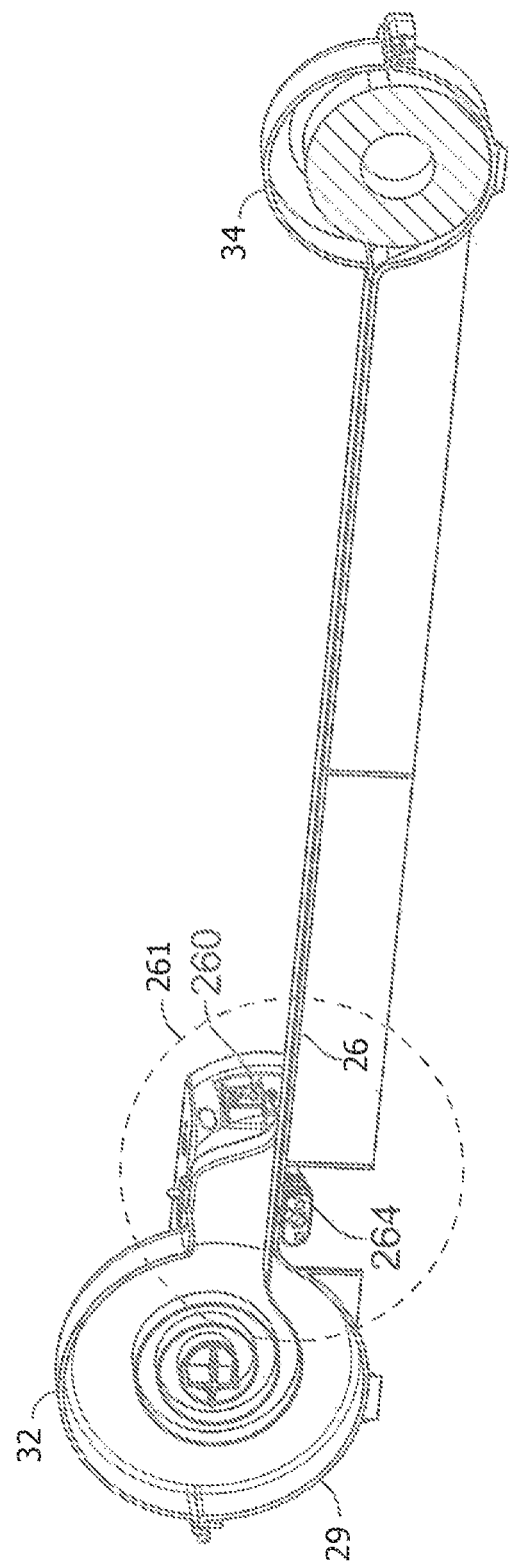
FIG. 28 shows one embodiment of sensors system of the control and drive module.
Figure 29:
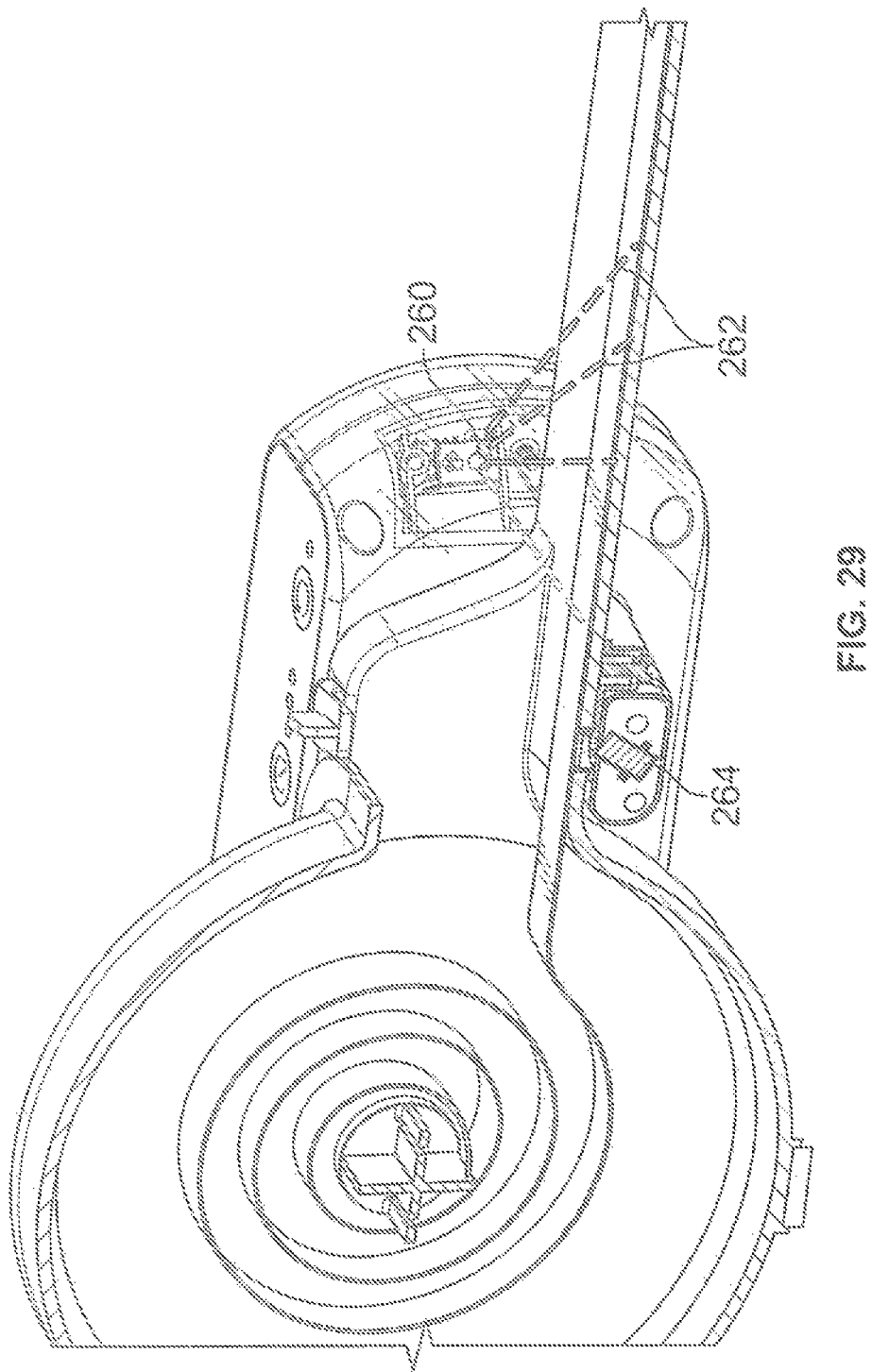
FIG. 29 shows another embodiment of the sensor system of the control and drive module.
Figure 37:
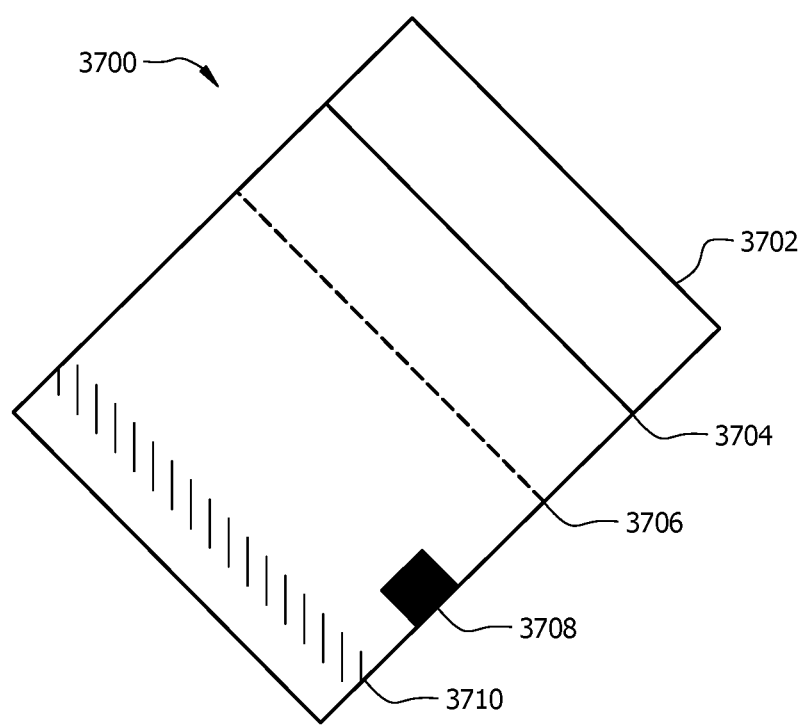
FIG. 37 shows one embodiment of the sensor marks on the waste pad.

In another embodiment, as shown in FIGS. 28 and 29, the control and drive module 36 includes a lower sensor 264, which may be configured to detect the markings 268, via IR, UV, or other detection 266, as the pad 12 is advanced from the supply housing 18, across the flat surface 16, to the take-up assembly 20. In another embodiment 3700, as depicted in FIG. 37, the markings on the pad 3702 may consist of a solid line 3704, dashed lines 3706, singular solid shapes 3708, or shading 3710 on the pad 3702. Additionally, the markings on the pad may be designed to be imperceptible to the human eye.

Figure 32:
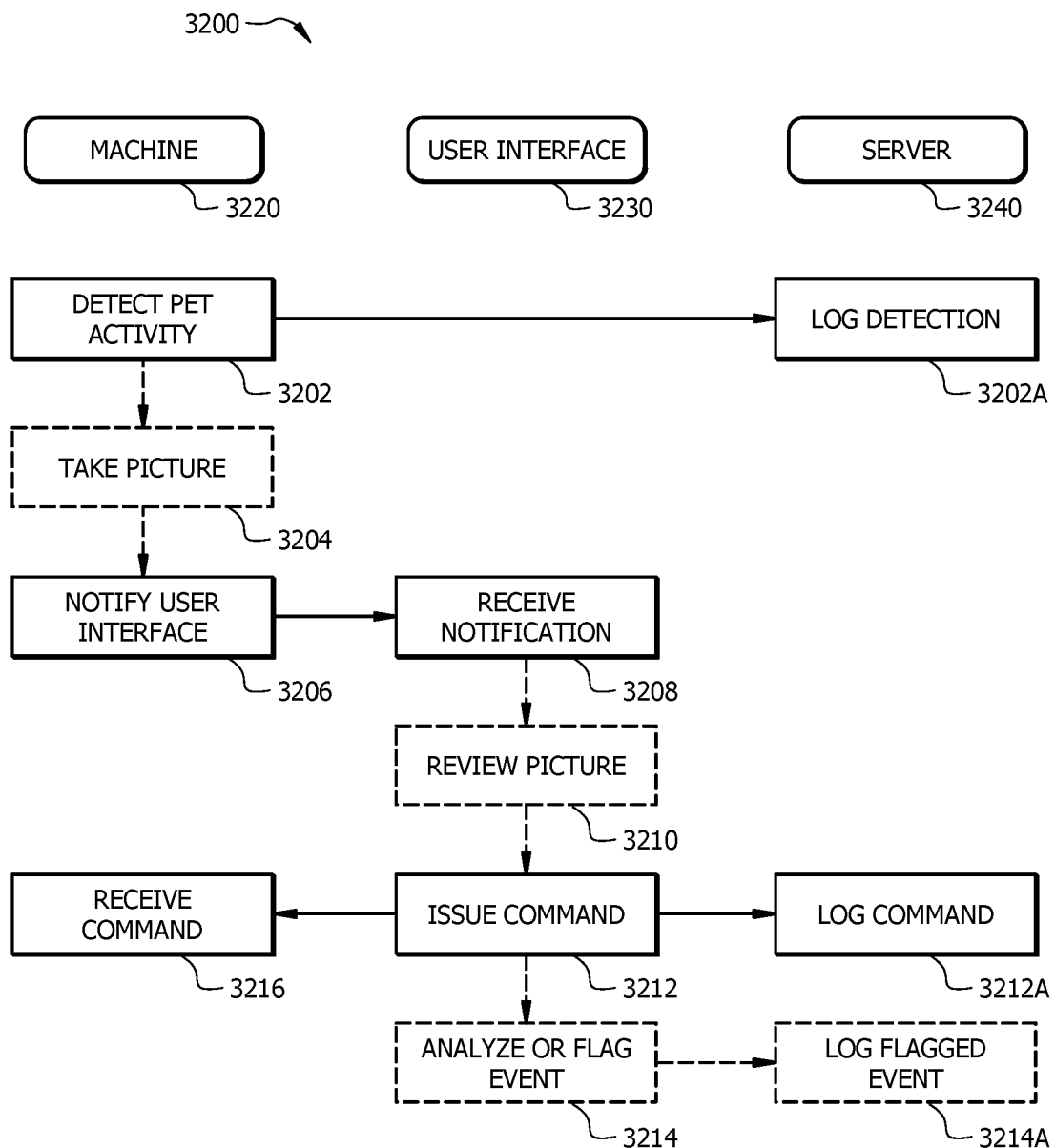
FIG. 32 shows an embodiment of a method used in the present disclosure.

As described, there are several methods of operating the pet waste machine and monitoring the health of the pet. In one embodiment 3200, as depicted in FIG. 32, the machine 3220 captures pet information 3202 through the sensor system and logs 3202A the pet information 3202 on a server 3240. The server 3240 analyzes the pet information 3202 and produces user data, which may include images, videos, analyses, notifications, and commands. In one embodiment, user data may include: animal detection, animal identification, and health issues or attributes. It should be understood that user data may originate from sources other than the server, such as, for example, the user. Thereafter, the server communicates 3206 the user data to the user interface 3230. Upon receiving the communication 3208, the user interface may issue a command 3212 to the machine 3220. When the machine receives the command 3216, the server 3240 logs the command 3212A. The method may be executed by the pet waste machine system 3800, as illustrated in FIG. 38 or any other variation disclosed herein.

In another embodiment, the server 3240 reviews the user data and formulates a command to the pet waste machine. Examples of a command may be, but are not limited to, advance a full sheet of the pad, a partial sheet of the pad, wait another cycle to advance the pad, or capture an additional image of the flat surface. In some embodiments, the server 3240 may be configured to delay advancing the pad for a period of time ("exit delay"). In one embodiment, the server may implement an exit delay to account for an animal quickly returning to the machine after exiting, which would count the subsequent return as one visit instead of two separate visits. Examples of time intervals for the exit delay may include, but are not limited to, 10 seconds, 30 seconds, 1 minute, 3 minutes, 5 minutes, and 10 minutes. It should be understood that the user may set or change the exit delay time period.

Figure 40:
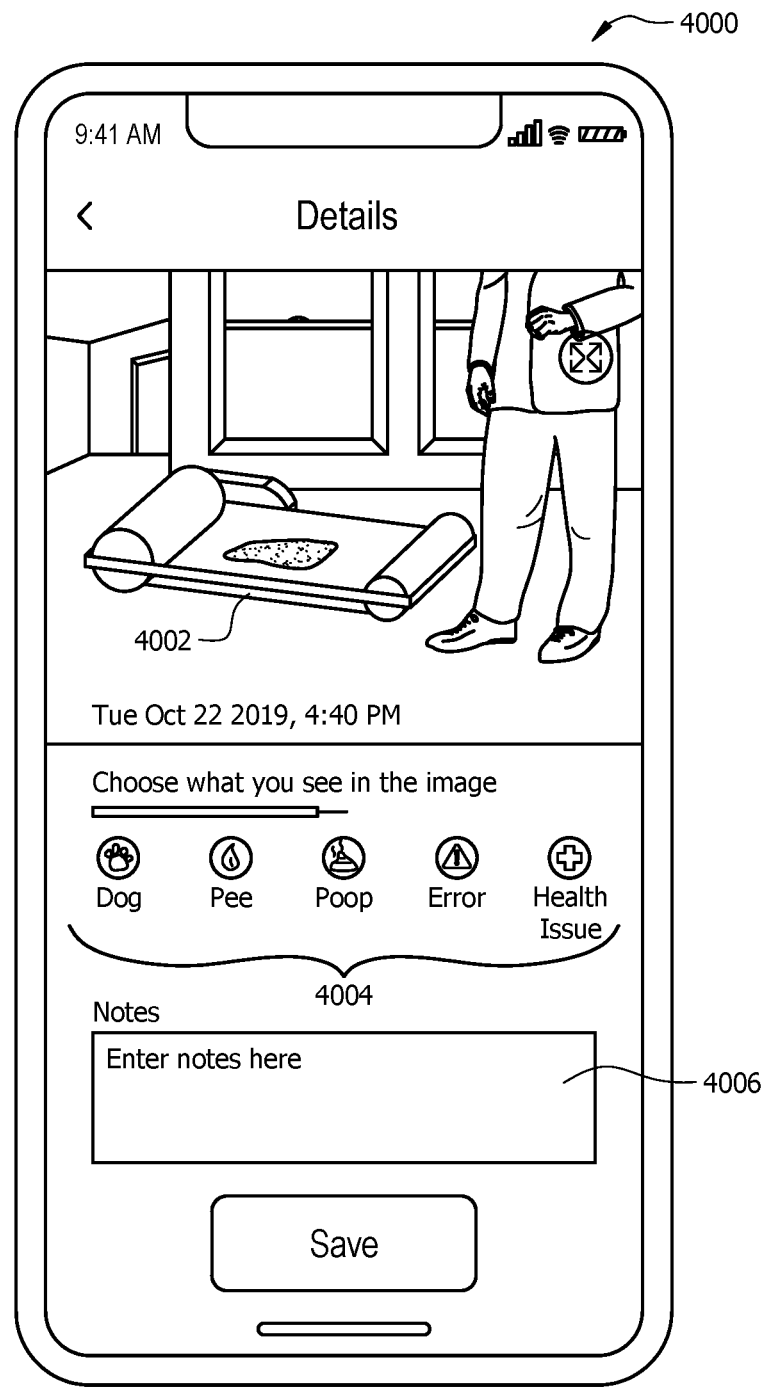
FIG. 40 shows another embodiment of the graphic user interface.

In another embodiment, the pet information captured by the sensor system may be pet motion. Alternatively, the pet information may be an image 3204 of the flat surface captured by a camera in the sensor system. Additionally, the server may be configured to analyze the image and generate user data based on image characteristics. The image characteristics may be based on the type of waste, consistency of the waste, the color of the waste, or the presence of blood in the waste. After the server 3240 analyzes the image and generates user data, the server may transmit the user data to the user interface 3230 for the user to review the results 3210. Alternatively, the server 3240 may be configured to communicate images to the user interface 3230 in order for the user to analyze the image 3214, wherein the user interface 3230 may be used to tag an image characteristic 3214 or compose a note, which are logged on the server 3214A. In one embodiment, as shown in FIG. 40 the user interface 4000 provides tags 4004 to characterize the captured image 4002 and an option to further describe the image in the notes box 4006. The tags 4004 may used to determine the presence of a pet, waste, waste characteristics (e.g., type of waste, health issues or attributes), or errors in the image. Additionally, this embodiment may further enable the user, via the user interface 3230, to confirm the analysis of what is in the image provided by the server 3240.

The server 3240 may also be configured to analyze the image of the pet pad for the presence of waste. In one aspect, if the server 3240 detects solid waste in the image, the server 3240 may be configured to issue a command to the pet machine 3220. Examples commands may be instructing a full sheet advance, a partial sheet advance, no sheet advancement, or notify a user interface. In another embodiment, the server 3240 may be configured to detect liquid waste in the image, issuing a command to the pet machine 3220 upon detection. In some embodiments, the pad supply may be configured to include an additive that reacts with liquid waste to produce a high-contrast color, which facilitate in the detection of the liquid waste. Examples of the command may be, but are not limited to, awaiting: an additional detection before advancing if there is a substantial amount of liquid waste detected, two additional detections if there is normal amounts of liquid waste detected, or three additional detections if there is minimal amount of waste detected. A substantial amount of waste may be defined as encompassing at least 30 percent of the pet pad; a normal amount of pet waste may be defined as encompassing between 10 and 30 percent of the pet pad; and a minimal amount of pet waste may be defined as encompassing less than 10 percent of the pet pad. It should be understood that the threshold of waste amounts may vary and that the user may change the threshold amounts according to their preference.

The pet information captured by the pet machine 3220 may also include the frequency of visits the pet makes to the waste machine in a given timeframe. For example, the server 3240 may be programmed with a threshold number of visits that the pet should make to the pet waste machine over a given amount of time. When the visits exceed the threshold amount within the given period of time, the server notifies the user interface 3230. It should be understood that the user may set the threshold value for visits and set the length of the time period. If the visits exceeds the number of threshold visits to the pet waste machine, it may be a signal to the user that the pet may have a health issue. In addition to detecting possible health issues, the server 3240 may be configured to automatically advance the pad after a predetermined number of pet visits. For example, the server 3240 may be programmed to automatically advance the pad after detecting 1 to 5 visits. It should be understood that the range of predetermined number of visits may be altered by the user.

The server 3240 may also be configured to analyze the image and determine the level of pad cleanliness. Pad cleanliness may be related to the type of waste on the pet pad and the amount of waste on the pet pad. In one embodiment, the server 3240 may be programmed to categorize the amount of waste present in the image as substantial, normal, or minimal. A substantial amount of waste may be defined as encompassing at least 30 percent of the pet pad; a normal amount of pet waste may be defined as encompassing between 10 and 30 percent of the pet pad; and a minimal amount of pet waste may be defined as encompassing less than 10 percent of the pet pad. It should be understood that the threshold of waste amounts may vary and that the user may change the threshold amounts according to their preference. Alternatively, the server 3240 may transmit the image to the user interface 3220 for a determination of pad cleanliness. As previously mentioned in previous embodiments, the user data related to pad cleanliness may be utilized in determining pad advancement. In another embodiment, the server 3240 may be programmed to categorize the waste as either liquid or solid.

As described, the system of monitoring and removing pet waste may have several configurations. As shown in FIG. 38, the system 3800 of monitoring pet activity and removing waste may be configured to include a pet waste machine 3802, user interface 3820, and server 3822, wherein the elements are wirelessly or directly in communication 3801. Direct communication may include, installing an element on a circuit board assembly of another element, hardwiring elements together, or tethering elements together by data cables. It should be understood that data cables include any known cable that transmits data such as, for example, USB and ethernet cables. Wireless communication between the elements includes any known method of wirelessly transmitting data such as, for example, WiFi, Bluetooth, cellular communication, or radio communication.

The pet waste machine 3802 may be comprised of a flat surface 3804, pad roll 3806, control and drive module 3808, and a weight sensing device 3818. The control and drive module 3808 may be comprised of a network connection 3816 and the sensor system 3810, which may be further comprised of an activity sensor 3812 and a camera 3814.

In one embodiment, the server 3822 may be in wireless communication with both the pet waste machine 3802 and the user interface 3820. In another embodiment, the server 3822 may be in direct communication with the pet waste machine 3802 and in wireless communication with the user interface 3820. For example, the server 3822 in one embodiment is a processing unit installed in the circuitry of the pet waste machine 3802, wherein the pet waste machine 3802 executes the functions of the server 3822 in previous embodiments. In another embodiment, the server 3822 may be in direct communication with the user interface 3820 and in wireless communication with the pet waste machine 3802. Alternatively, the server 3822, pet waste machine 3802, and user interface 3820 may all be in direct communication with one another. In an optional embodiment, the pet waste machine 3802 may be configured to be in direct communication with the user interface 3820 while the server 3822 is in wireless communication with the pet waste machine 3802 and the user interface 3820.

Additionally, other embodiments of the system may include a weight sensing device 3818 connected to the flat surface 3804. The weight sensing device 3818 may be configured to record the weight of the pet and log each weighing on the server. Subsequently, the pet waste machine 3802 may be configured to notify the user interface 3820 when the pet weight fluctuates outside of a predetermined value. Additionally, the weight sensing device 3818 may be configured to capture the weight of the waste left behind after a visit, which may be utilized to monitor the health of the pet, manage the advancement of the pad supply, or manage the inventory of the pad supply.

The user interface 3820 may be configured to control pad advancement based on an image of the flat surface 3804 after the pet exits the pet waste machine 3802. In one embodiment, the pet waste machine 3802 may be configured to notify the user interface 3820 of pet activity, wherein the notification enables the user to remotely capture an image of the pad, enabling the user to advance the pad based on the image. In another embodiment, the sensor system 3808 captures an image of the flat surface 3804 and transmits a notification to the user interface 3820, accompanied with the picture, enabling a user to decide whether to advance the pad. Alternatively, the user may advance the pad without viewing an image of the flat surface 3804.

In another embodiment, the server 3822 is configured to determine the inventory level of the roll of pad in the pet waste machine. Referring to FIG. 37, the server may be configured to correlate the number of marks or indications passed over the sensor to the remaining supply in the pad. For example, the pad may be marked with identifying marks at certain intervals, which may correlate to the amount of pad consumed such as: ¼ of the pad consumed, ½ of the pad consumed, ¾ of the pad consumed, and all of the pad consumed. Examples of such marks or indications include, but are not limited to, shading 3710, a solid mark, 3708, perforation or dashed lines 3706, or solid lines 3704 located on the pad. Additionally, the pad may be marked with a distinguishing color at a certain interval that is detected by the sensor system. Additionally, the markings on the pad may be designed to be imperceptible to the human eye. In another embodiment, the server may be configured to notify the user interface when the pad supply falls below a predetermined level, such as ½ or less of the pad remaining.

The markings at regular intervals may also be utilized to advance portions of the pad. For example, a full sheet on a pad may be comprised of 5 marks; therefore, the user interface may select an advancement of 0-5 marks in the app, which correspondingly advances the pad. It should be understood that the number of marks in a full sheet may vary according to the size of the machine and the size of the pad supply. The pet waste machine may also be configured to expand or contract to additional sizes based on user preference, which may alter the size of the pad supply and the number of markings in a full sheet. In one embodiment, the pet waste machine may be extended or contracted by two sizes, providing three sizes: small, regular, or large. The size of a full sheet of pad supply corresponding to these pet waste machine sizes may be 3 marks, 5 marks, or 7 marks, respectively. It should be understood that the size of the machine may be expanded further. It should be understood that the size of the pad supply may vary and, accordingly, so may the threshold value of marks.

Figure 41:
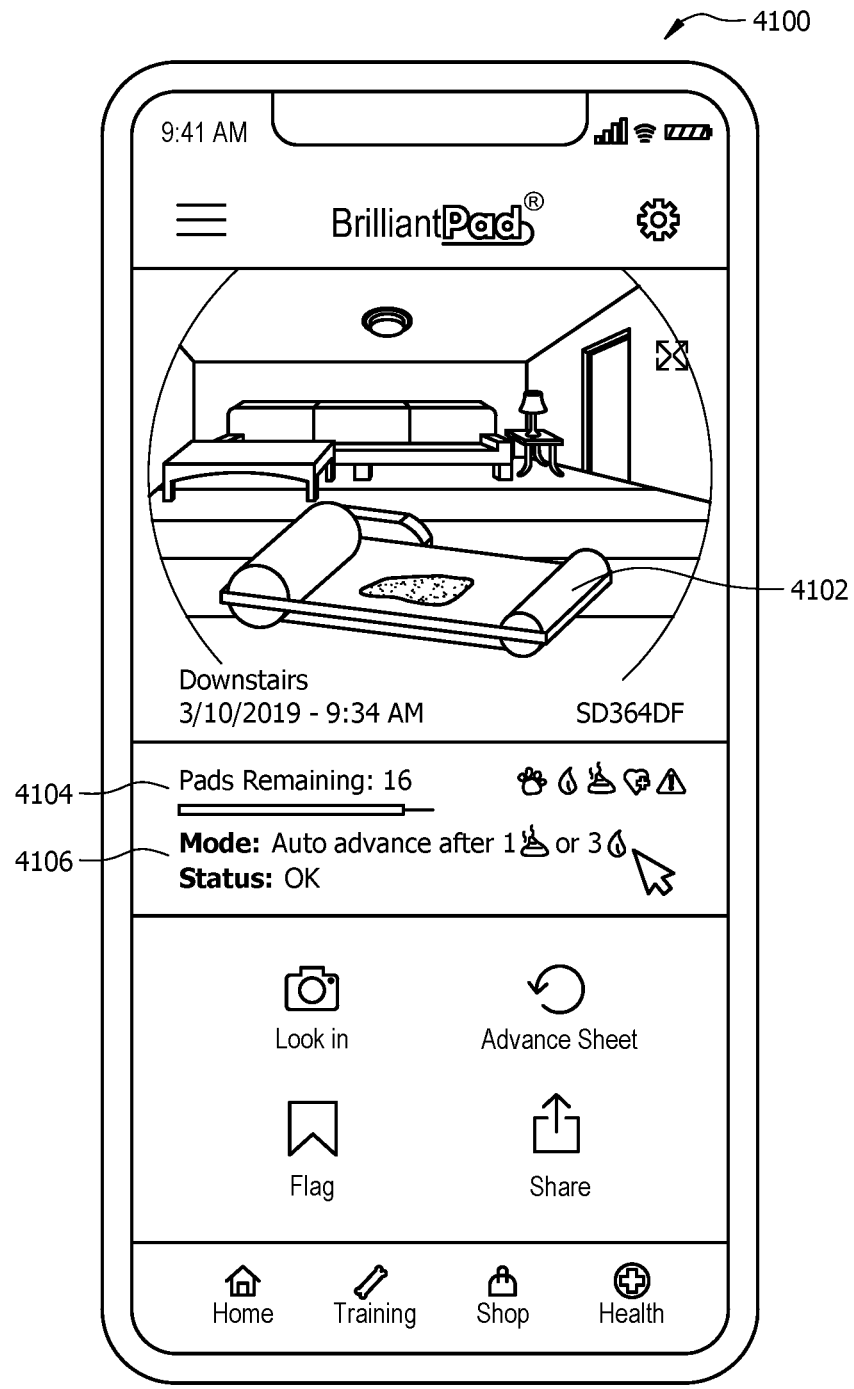
FIG. 41 shows another embodiment of the graphic user interface.

In another embodiment, the server 3822 may be configured to automatically reorder pads when the supply level falls below a predetermined level and reorders pad supplies based on a user's desired inventory level and order history. As shown in FIG. 41, the user interface 4100 may be configured to illustrate the remaining pad supply 4104 in the pet waste machine in addition to the image 4102 of the flat surface. Suggestions to the user can be transmitted for reordering pad supply as well. The server, or commands from the user interface, manage the pad usage in one aspect of the invention. For example, when a predetermined portion of the pad has been used, the paper usage rate may be slowed down to conserve the pad supply.

The server 3822 may also be configured to account for the quantity of fresh pad supply rolls in addition to the roll in use. Accordingly, the server 3822 may be configured to reorder more pad supply when the remaining quantity of fresh pad supply drops below a predetermined value. Alternatively, the server 3822 may be configured to transmit user data to the user interface 3820 notifying the user of a low quantity of pad supply, where in the user may reorder additional pad supply through the user interface 3820.

In one embodiment, the weight sensing device 3818 captures the weight of the pet during each visit to the pet waste machine 3802. In one aspect, the server 3822 sets a threshold weight for the pet and notifies the user interface 3820 when the measured weight is outside of the threshold. In another aspect, the server 3822 notifies the user interface 3820 of troubling weight trends. Weight trends, for example, are continuously increasing or decreasing weight over a period of time. The period of time can be a week, a month, or a year.

Figure 39:
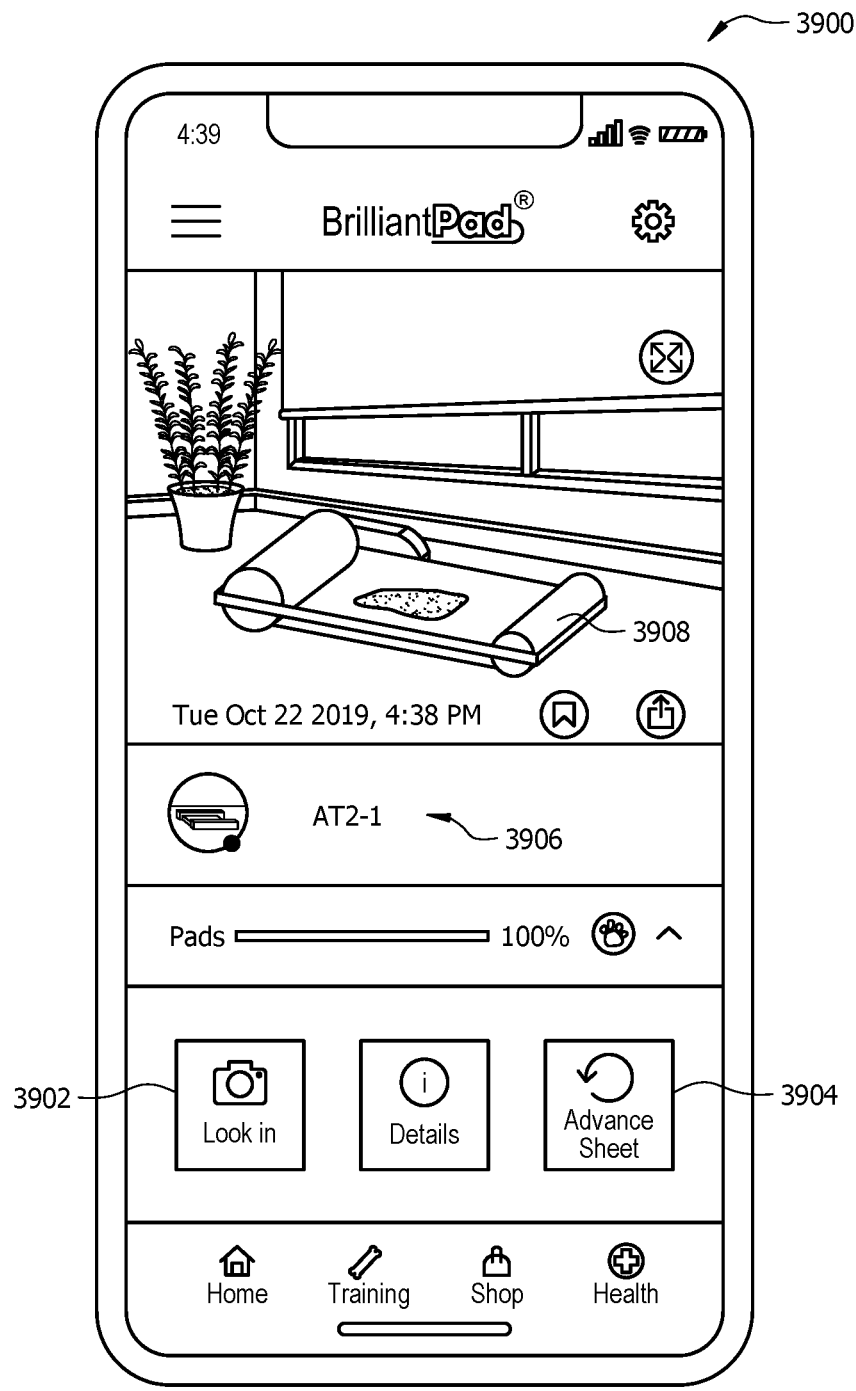
FIG. 39 shows another embodiment of the graphic user interface.

FIGS. 33 and 34 depict graphic user interfaces 3300, 3400 displayed on one embodiment of the user interface of the present invention. The graphic user interface 3300 of FIG. 33 illustrates example command options or features 3302, 3304, 3306 that are accessed by user selection features 3308, 3310. The graphic user interface 3400 of FIG. 34 shows a notification 3402 to the user as well as various command options 3404, 3406, 3408, 3410, 3412, 3416, 3418 that can be selected by a user. FIG. 39 depicts the main user interface 3900. The "Look In" icon 3902 enables the user to view 3908 the area in and around the flat surface of the pet waste machine. The "Advance Sheet" icon 3904 enables the user to advance the sheet. The "Advance Sheet" 3904 command may be made either after viewing an image of the flat surface for waste or without viewing an image for waste. The machine selection icon 3906 enables the user to select different pet waste machines in a given system.

By combining a control and drive module 3808 coupled with the pet waste station 3802, a server 3822 in communication (wireless or direct) with the control and drive module 3808, and a user interface 3820 in communication (wireless or direct) with the server 3822, the present invention provides valuable information to a user and the ability to manage the pet waste station 3802 remotely. For example, the user can be informed of pet activity such as the number and types of visits per day to the pet waste station. If this activity deviates from the historical activity for the pet, a health issue may be the cause. The server 3822, in one embodiment, can alert the user via the user interface 3820 with a health notice or data when such abnormal deviation occurs. Similarly, if a threshold number of visits is exceeded, such threshold set by the user, the server 3822 can issue a notice of such event. The server 3822, in another embodiment, can advance the pad 3806 after waste is detected by the sensor system 3810. Depending on the type of waste detected by the sensor system 3810, the server 3822 may advance the pad 3806 at different intervals. For example, as shown in FIG. 41, the server may be configured to advance the pad after a single solid waste detection 4104 yet also configured to advance the pad after multiple liquid waste detections 4106. The addition of a weight sensor 3818 below the pad is used, in one embodiment, to monitor the weight of the pet over time. Again, if an abnormal trend is determined by the server 3822, a health notification is issued to the user via the user interface 3820. In another embodiment, the weight sensor 3818 provides information about stool weight to the server 3822.

The embodiment of the invention using a camera 3814 to capture waste images adds another powerful feature to the present invention. Images of the waste on the pad 3806 are used to generate both health notices or data to the user and to manage the pad usage, for example. Images are transmitted to the server 3822, which can pass on such images to the user interface 3820 and/or analyze the images for health attributes or issues associated with the image and the generation of health notices or health data to the user interface 3820. For example, the server 3822 may detect blood in a stool when analyzing an image. Such detection prompts a health notice transmission to the user interface 3820. The image is accessed by the user at the user interface 3820, and can be tagged and stored by the user, thus making it available for analysis by a pet health professional at a later date. The stored image is date tagged as well to provide information on when the event occurred. A similar sequence is followed for abnormally wet or runny stools, stools that exhibit an abnormal color, or stools containing foreign objects. The images and health notification provide a user with both early and real-time indications of health issues and store such data to assist with determining health trends. On the pad management front, images from the camera 3818 are used, in one embodiment, to determine the amount and type of waste on the pad 3806 and pad cleanliness. For example, if the user prefers to conserve pad paper, it may be desirable to forgo the advancement of the paper until sufficient urine has accumulated to justify such advancement. When a predetermined amount of paper has been used, the server 3822 can also prompt the user to reorder more pad supplies. The user can optionally instruct, via the user interface 3820, the pad speed or advancement intervals reduced in order to conserve paper until supplies can be replenished.

These and other aspects of the invention advance the goal of giving the user information about the usage of the pet waste station, information about the health of the pet using the station, and control over operation of the station, even when the user is located remotely from the pet waste station.

Figure 57:
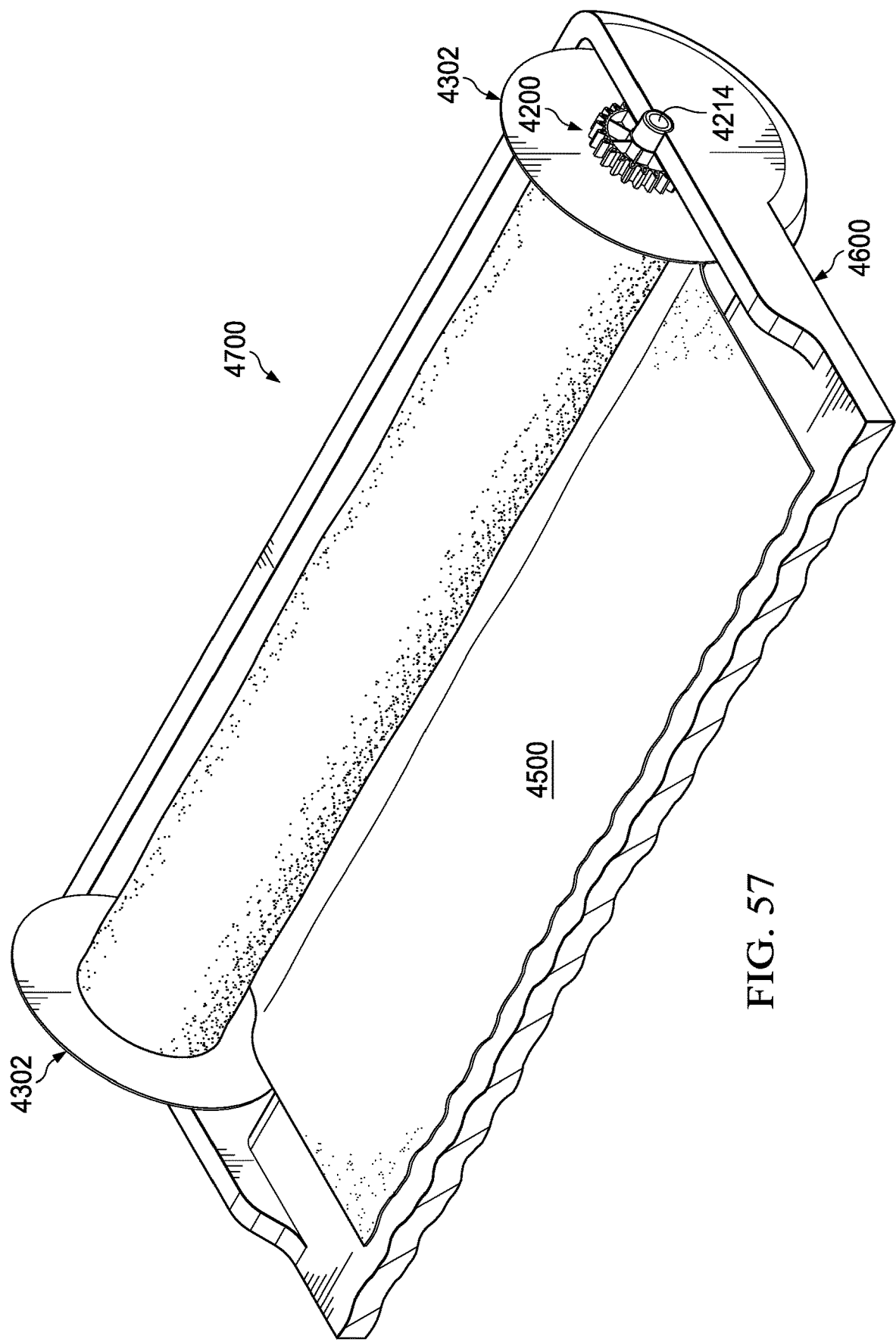
FIG. 57 shows an embodiment of a pet waste roll assembly.

Referring to FIG. 57, an embodiment of a pet waste assembly 4700 is shown. The pet waste assembly 4700 comprises a set of single piece, molded sprocket adapters 4200 that are removably coupled to a set of end caps 4302 and a take-up rod (not shown). A set of single piece, molded sprocket adapters 4200 and end caps 4302 is defined as one or more. The pet waste assembly 4700 may further comprise a waste pad 4500 and a pet waste machine 4600. A shaft 4214 extending from the set of single piece, molded sprocket adapters 4200 is configured to movably couple to the pet waste machine 4600. The waste pad 4500 may be coupled to the set of single piece, molded sprocket adapters 4200 and/or the take-up rod. In some embodiments, the waste pad 4500 is stretched across the pet waste machine 4600 and coupled to the set of single piece, molded sprocket adapters 4200 and/or the take-up rod.

Figure 42:
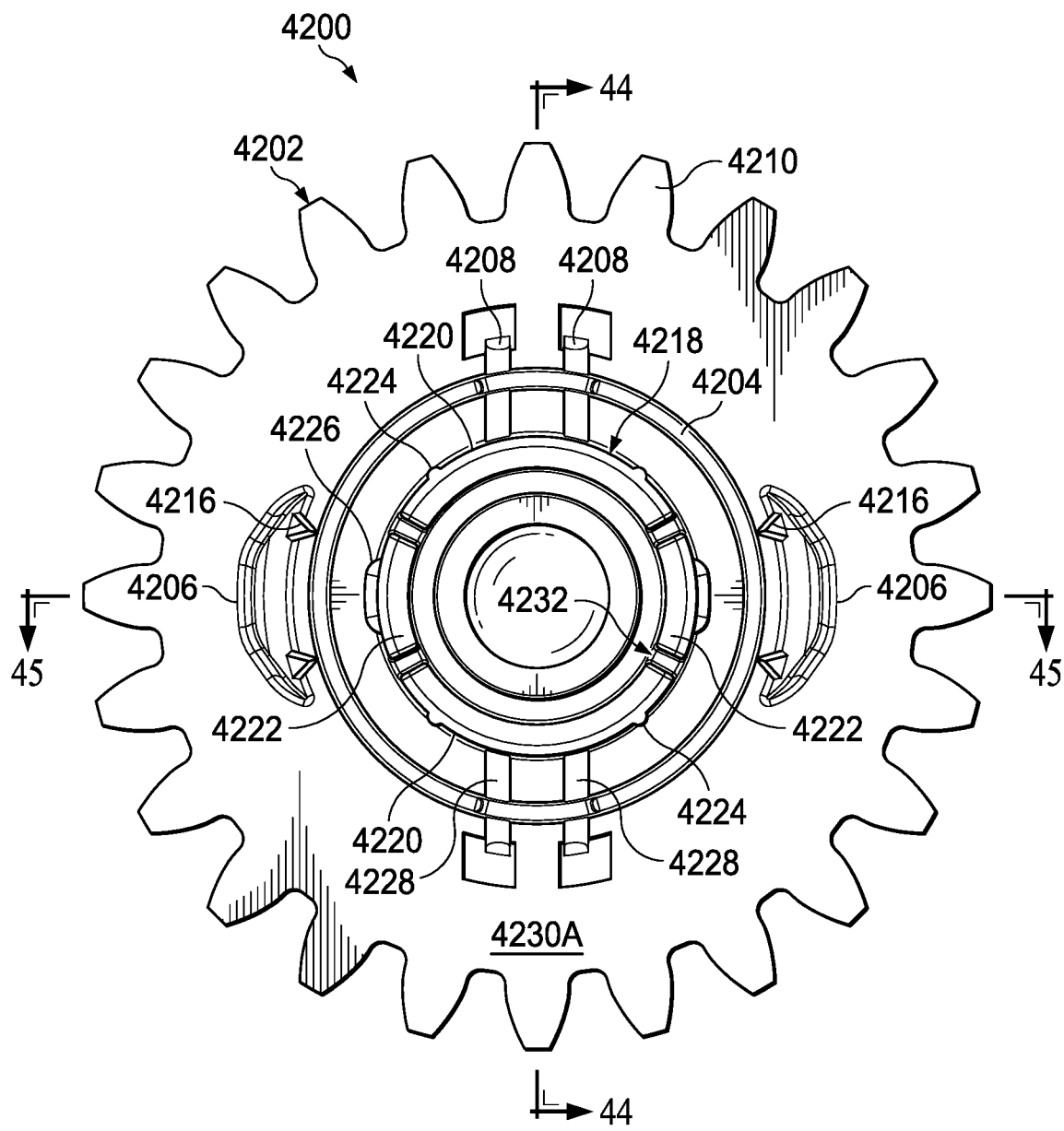
FIG. 42 shows a top view of an embodiment of a sprocket adapter.
Figure 43:
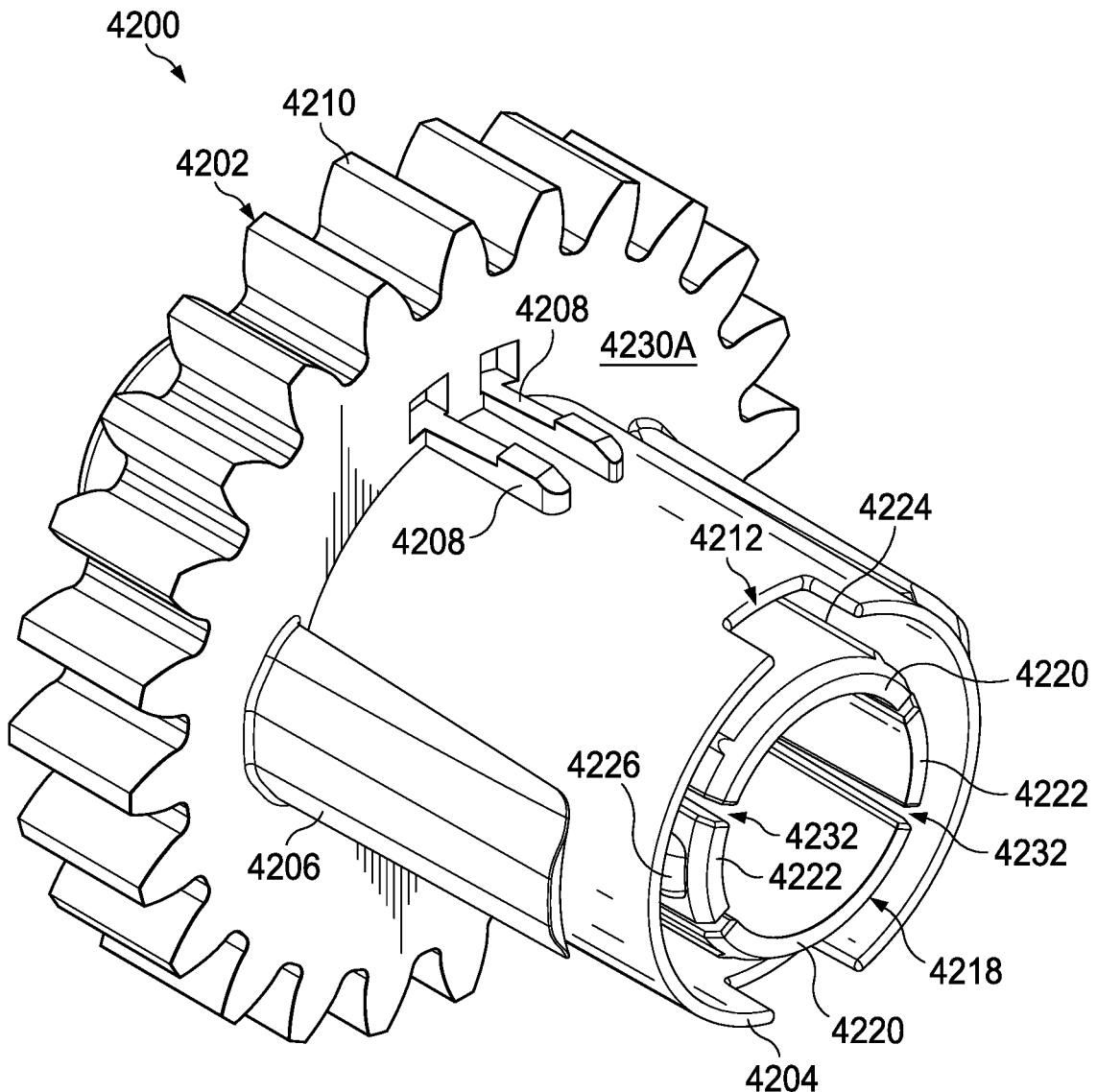
FIG. 43 shows a perspective view of an embodiment of a sprocket adapter.

Referring to FIGS. 42 to 45, an embodiment of the sprocket adapter 4200 is illustrated. The sprocket adapter 4200 comprises a sprocket 4202 having a first side 4230A and a second side 4230B, which comprises teeth 4210 extending outward in a radial direction. The sprocket adapter 4200 further comprises a first tube 4204 extending from the first side 4230A of the sprocket 4202. The first tube 4204 may have a length ranging from 10 mm to 50 mm and a diameter ranging from 5 mm to 35 mm. Additionally, the first tube 4204 may have a length of 28 mm and a diameter of 2.5 mm. The first tube 4204 may comprise a set of outer couplers 4208 extending from an outer surface of the first tube 4204. The first tube 4204 may further comprise a set of inner couplers 4228 extending from an inner surface of the first tube 4204. The set of outer couplers 4208 are configured to couple with an end cap 4302. The set of outer couplers 4208 may comprise teeth located at the distal end from the sprocket 4202. As explained herein, teeth on the set of outer couplers can function as a retaining feature. Additionally, the sprocket 4202 may be configured to include apertures that are aligned with the set of outer couplers 4208. The apertures enable a user to view the area outside of the first side 4230A of the sprocket 4202 to confirm whether an object is engaged with the teeth of the set of outer couplers 4208. The set of inner couplers 4228 are configured to couple with the take-up rod 4402. The set of outer couplers 4208 and the set of inner couplers 4228 may have a length between 4 mm and 10 mm. In one embodiment, the set of outer couplers 4208 and the set of inner couplers 4228 have a length of about 11 mm. Additionally, the set of outer couplers 4208 and the set of inner couplers 4228 may have varying lengths. The first tube 4204 may further comprise a set of slots 4212. As illustrated in FIG. 43, the sprocket adapter 4200 may be configured with two opposing slots 4212 recessed from the distal end of the first tube 4204 toward the first side 4230A of the sprocket 4202. In some embodiments, the set of slots 4212 is configured to couple with a protrusion on the take-up rod 4402. The set of slots 4212 may have a width ranging between 5 mm and 10 mm and a length ranging from about 2 mm to 6 mm. In one embodiment, the set of slots 4212 has a width of 7 mm and a length of 4 mm.

Figure 44:
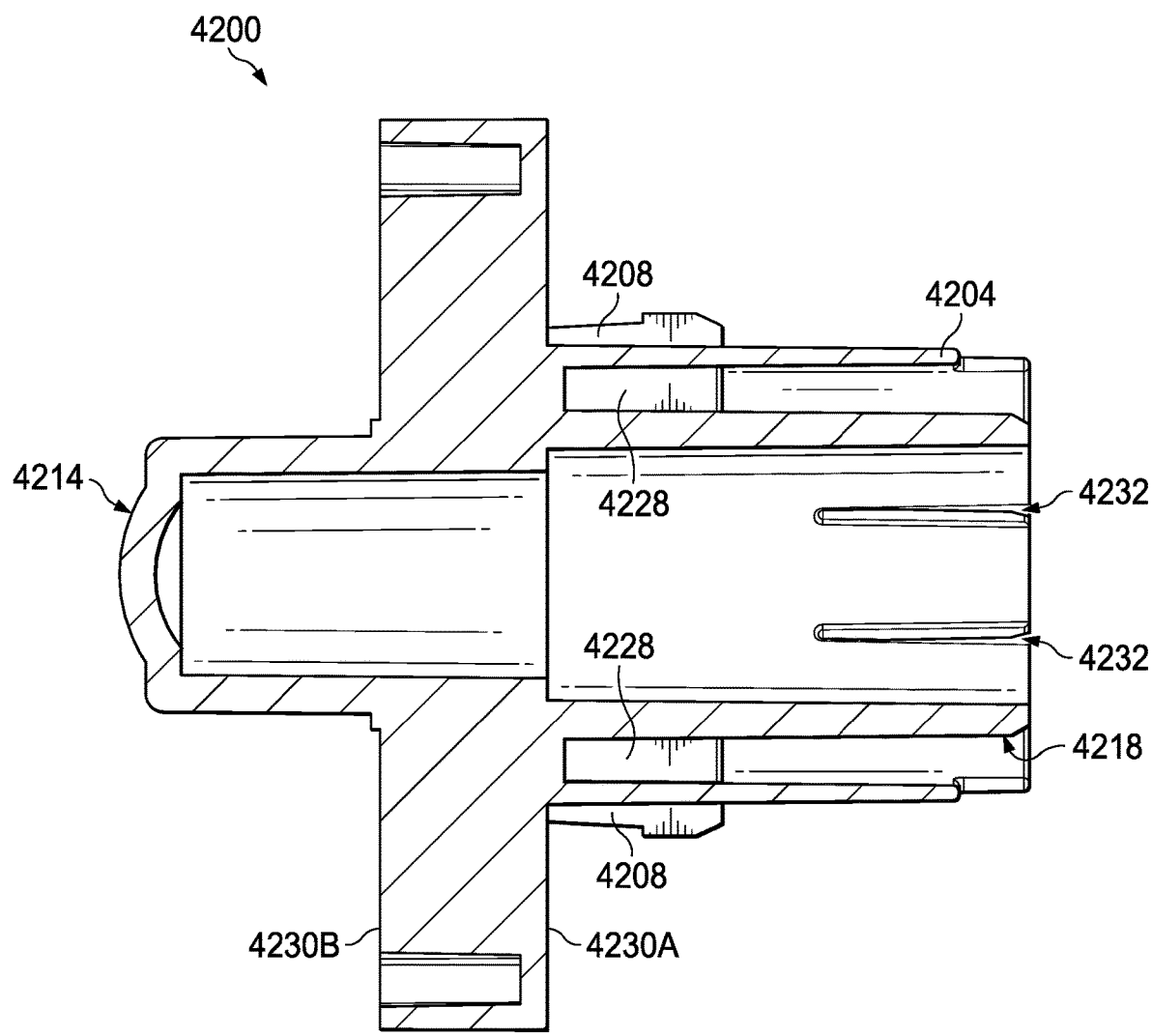
FIG. 44 shows a sectional view of an embodiment of a sprocket adapter.
Figure 53:
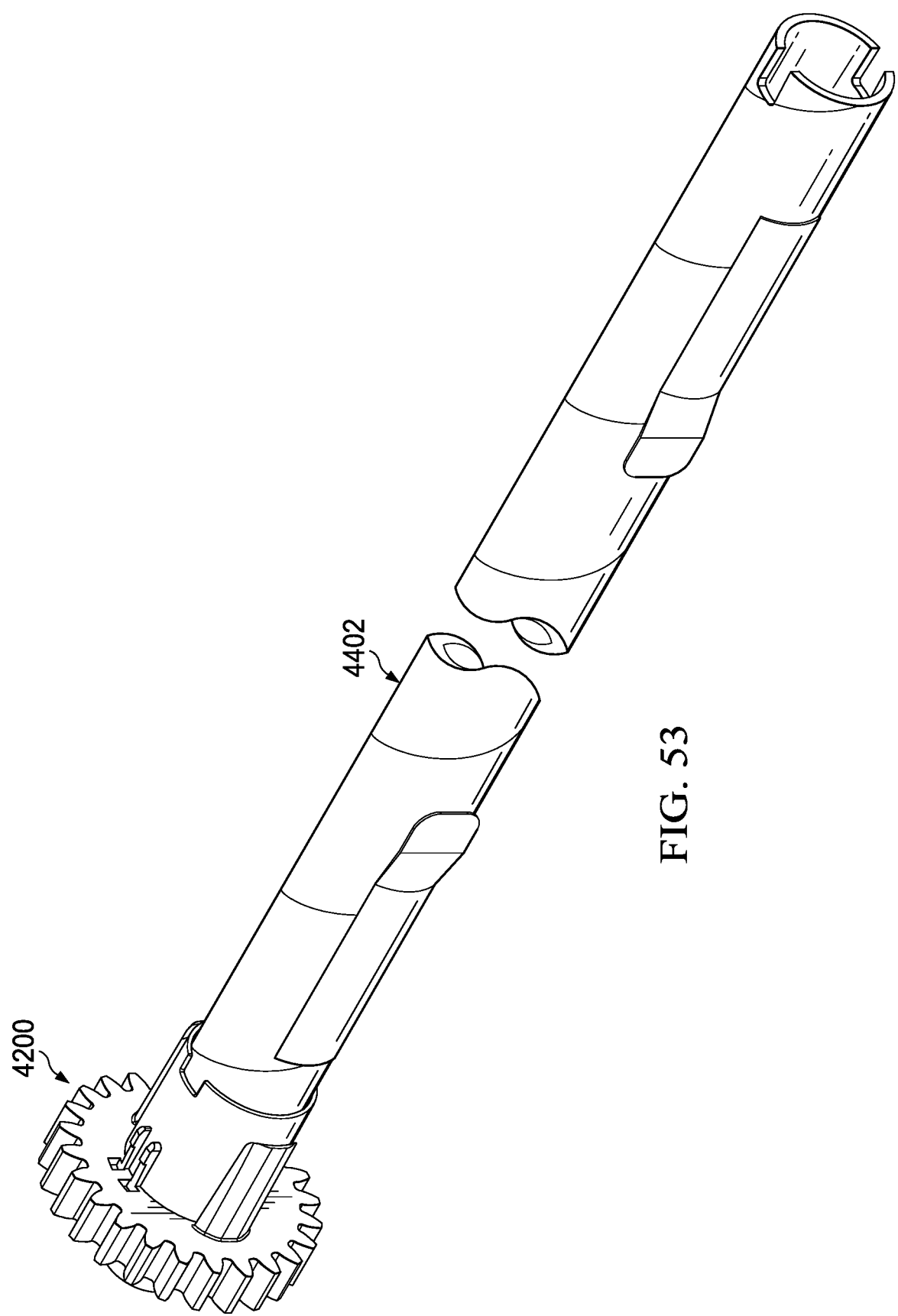
FIG. 53 shows a perspective view of an embodiment of a sprocket adapter coupled to a take-up rod.

The sprocket adapter 4200 further comprises a second tube 4218 extending perpendicularly from the first side 4230A of the sprocket 4202 and concentrically located inside of the first tube 4204. In some embodiments, the second tube 4218 has a plurality of slots 4232 extending from a midpoint along the second tube 4218 and terminates at a distal end of the second tube 4218. The second tube 4218 may comprise a set of radial protrusions 4226 and/or linear protrusions 4224. The plurality of slots 4232 has a length between 1 mm and 15 mm. Alternatively, the plurality of slots 4232 may extend up to the entire length between the distal end of the second tube 4218 and the base 4230. In some embodiments, as illustrated in FIGS. 42 to 44, the second slotted tube 4218 may comprise four slots 4232 that define two minor distal tube walls 4222 and two major distal tube walls 4220. The major distal tube walls 4220 may comprise a set of linear protrusions 4224. The minor distal tube walls 4222 may comprise a set of radial protrusions 4226. The sets of protrusions 4224, 4226 are configured to couple with the take-up rod 4402, as shown in FIG. 53. A set of radial protrusions 4226 and linear protrusions 4224 are defined as one or more. The second tube 4218 may have a length ranging from 10 mm to 50 mm and a diameter ranging from 0.4 mm to 44 mm. Additionally, the second tube 4218 may have a length of 28 mm and a diameter of 17 mm.

In some embodiments, the set of inner couplers 4228 is coupled to the inner surface of the first tube 4204 and the outer surface of the second tube 4218. In other embodiments, the set of inner couplers 4228 extends from the outer surface of the second tube 4218 towards the first tube 4204. As shown in FIGS. 42 and 43, the second tube 4218 may be oriented to have the first portion aligned with the set of outer couplers 4208 and the set of inner couplers 4228. Alternatively, the second tube 4218 may be oriented to have the second portion aligned with the set of outer couplers 4208 and the set of inner coupler 4228.

With continued reference to FIGS. 42 to 45, the sprocket adapter 4200 further comprises a set of fins 4206 extending perpendicularly from the first side 4230A of the sprocket 4202 and exterior to the first tube 4218. A set of fins 4206 is defined as one or more. The set of fins 4206 may have a length ranging from 15 mm to 30 mm and a width ranging from 5 mm to 15 mm. In at least one embodiment, the set of fins 4206 have a length of 24 mm and a width of 10 mm. The set of fins 4206 may comprise at least one linear protrusion 4216 extending inward toward the first tube 4204. The at least one linear protrusion 4216 may be configured to secure a waste pad for winding up around the take-up rod. The at least one linear protrusion 4216 may have a tapered figure, with a larger thickness near the first side 4230A of the sprocket 4202 and a smaller thickness near the distal end of the first tube 4204 to facilitate insertion of the waste pad. In some embodiments, the sprocket adapter 4200 comprises two opposing fins 4206 with each fin 4206 having two radial protrusions 4216. Waste pad may be inserted into the space between the linear protrusion 4216 and the first tube 4204 and toward the first side 4230A of the sprocket 4202. As the waste pad approaches the first side 4230A of the sprocket 4202, the linear protrusion 4216 secures the waste pad to the sprocket adapter 4200, thereby enabling the waste pad to be wound up.

Figure 45:
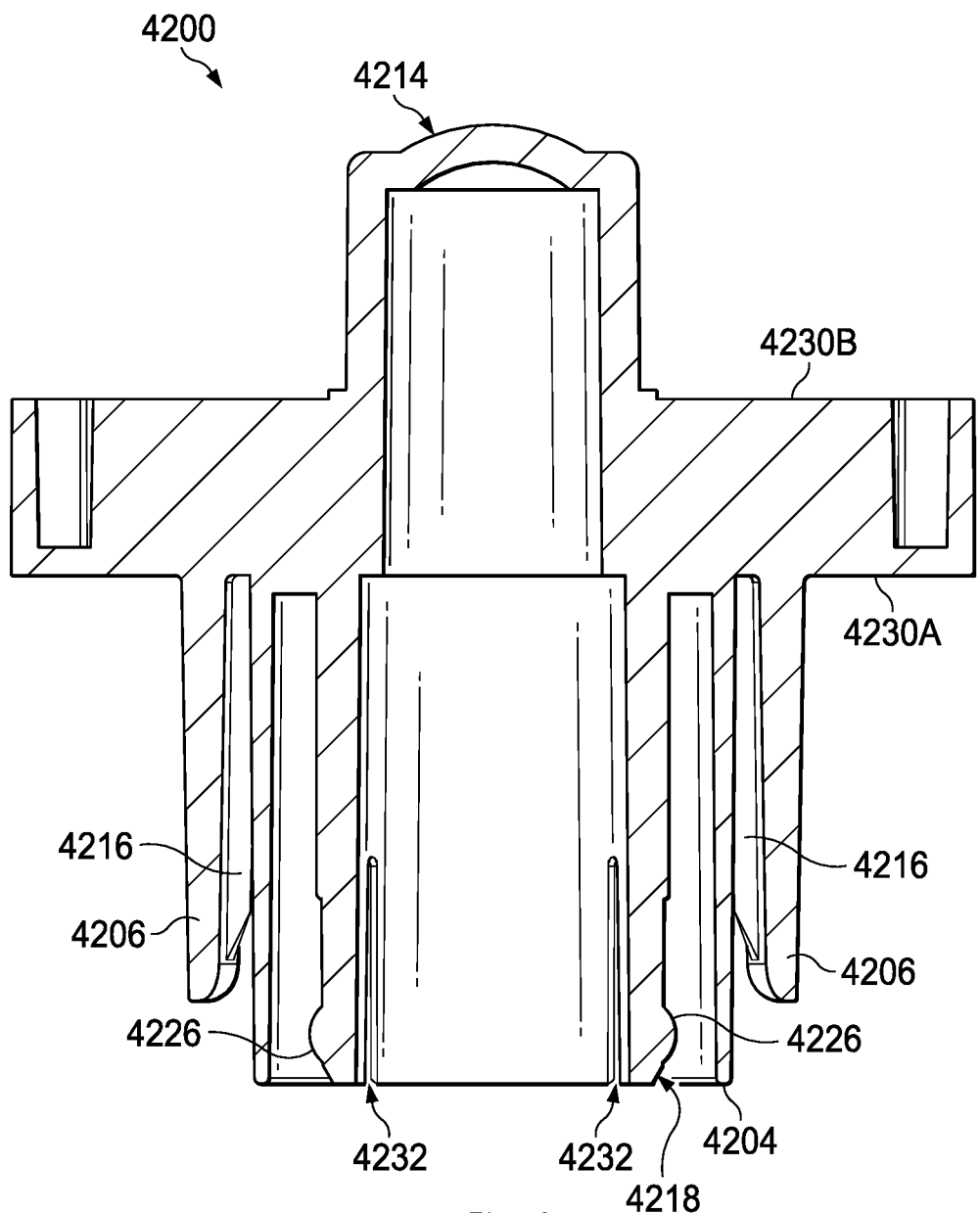
FIG. 45 shows a sectional view of an embodiment of a sprocket adapter.

Additionally, as seen in FIGS. 44 and 45, the sprocket adapter may further comprise a shaft 4214 extending perpendicularly from the second side 4230B of the sprocket 4202. As shown in FIG. 57, the shaft 4214 is configured to movably couple to the pet waste machine 4600. In some embodiments, the shaft 4214 has a length ranging from 5 mm to 20 mm and a diameter ranging from 5 mm to 20 mm. In at least one embodiment, the shaft 4214 has a length of 13 mm and a diameter of 15 mm.

Figure 49:
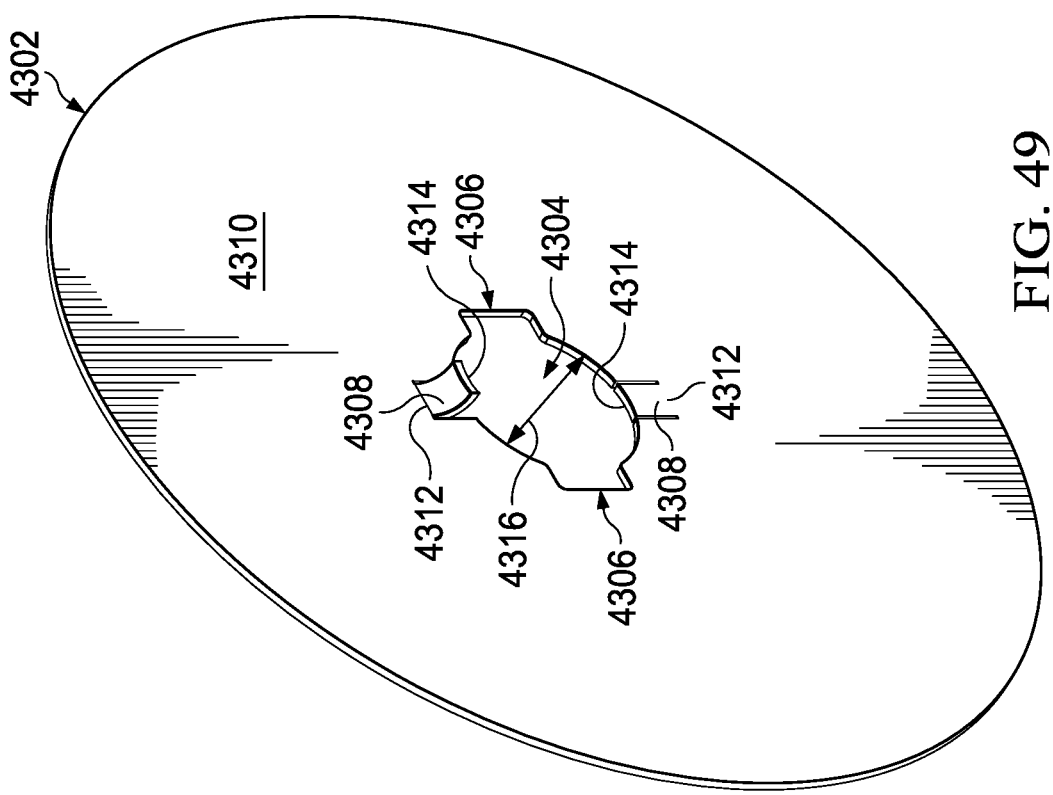
FIG. 49 shows a perspective view of an embodiment of an end cap.

Referring to FIG. 49, an embodiment of an end cap 4302 is shown. The end cap 4302 comprises a base 4310 having an aperture 4304. The aperture 4304 has two circular portions 4316 and two slotted portions 4306. The two slotted portions 4306 may be configured to oppose each other. The distance between the two circular portions 4316 may range from 5 mm to 40 mm. In at least one embodiment, the distance between the two circular portions 4316 is 27 mm. The two slotted portions 4306 may have a length ranging from 3 mm to about 8 mm and a width ranging from 5 mm to about 20 mm. In at least one embodiment, the two slotted portions 4306 have a length of 6 mm and a width of 13 mm. The two slotted portions 4306 may also be configured to include flaps.

The end cap 4302 further comprises a set of flaps 4308 configured to couple to the set of outer couplers 4208 when the end cap 4302 is secured to the sprocket adapter 4200. The set of flaps 4308 include a first end 4312 connected to the base 4310 of the end cap and a second end 4314 forming a boundary to the aperture 4304. In some embodiments, the end cap 4302 comprises two flaps 4308 that oppose each other. The set of flaps 4308 may have a length ranging from 3 mm to 15 mm and a width ranging from 3 mm to 15 mm. In at least one embodiment, the set of flaps has a length of 8 mm and a width of 8 mm.

Figure 46:
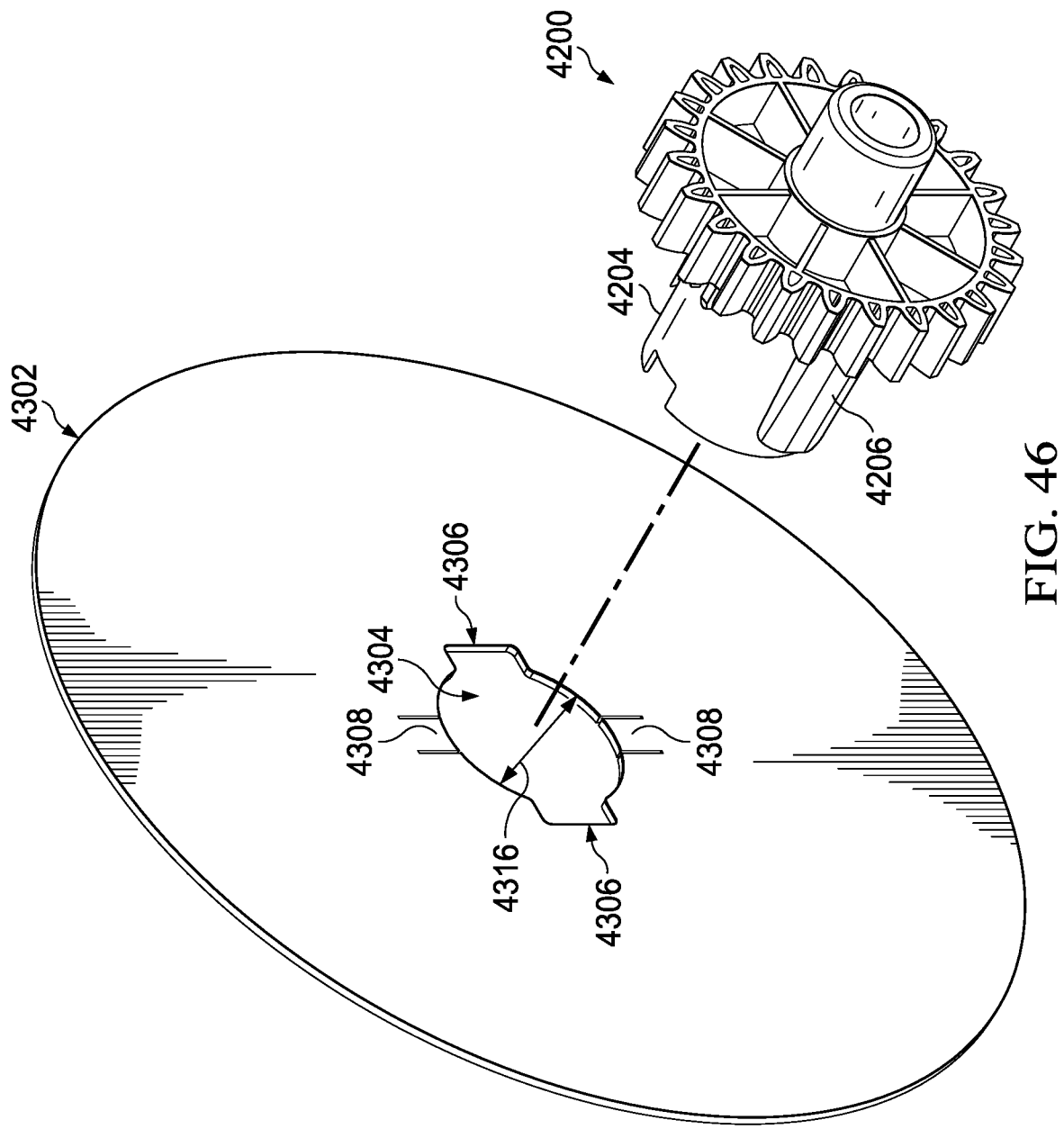
FIG. 46 shows a perspective view of an embodiment of a sprocket adapter and an end cap.
Figure 48:
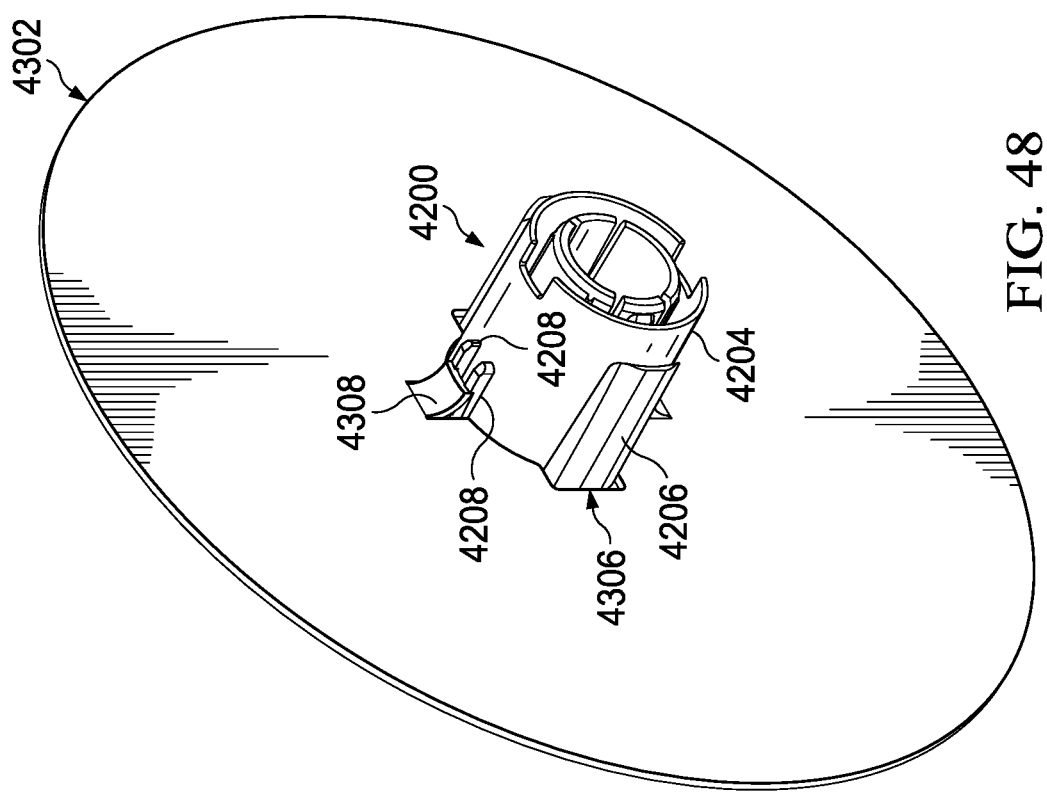
FIG. 48 shows a perspective view of an embodiment of a sprocket adapter coupled to an end cap.
Figure 47:
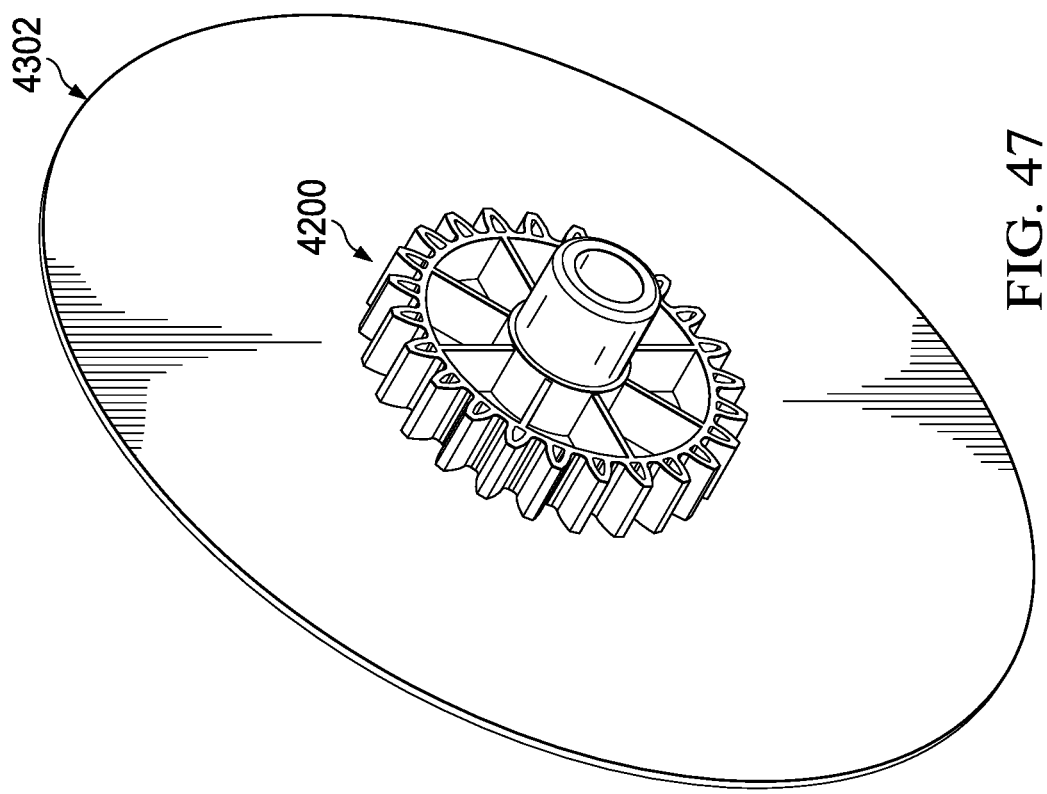
FIG. 47 shows a perspective view of an embodiment of a sprocket adapter coupled to an end cap.

Referring to FIGS. 46 to 48, the sprocket adapter 4200 is configured to couple with the end cap 4302 is shown. The second side 4230B of the sprocket adapter 4200 may comprise a plurality of recesses. The aperture 4304 is configured to fit around the first tube 4204 as the end cap 4302 is secured onto the sprocket adapter 4200. The distance between the two circular portions 4316 of the aperture 4304 is substantially the same size as the diameter of the first tube 4204. Substantially the same size is defined as plus or minus 3 mm. The two slotted portions 4306 are configured to fit around the set of fins 4206 as the end cap 4302 is fitted onto the sprocket adapter 4200. In configurations where the two slotted portions 4306 include flaps, the flaps can engage the outer surface of the set of fins 4206 to increase the retention between the end cap 4302 and the sprocket adapter 4200. The set of flaps 4308 is configured to couple with the at least one outer coupler 4208. As the end cap 4302 couples onto the sprocket adapter 4200, the at least one outer coupler 4208 slides through the at least one tab 4308. The set of flaps 4308 applies a force onto the at least one outer coupler 4208, which keeps the end cap 4302 coupled to the sprocket adapter 4200. In configuration where the at least one outer coupler 4208 includes teeth, the set of flaps 4308 will engage with the teeth (FIG. 48) to increase the retention between the end cap 4302 and the sprocket adapter 4200. The end caps 4302 may be separable, which allows for easier packaging and transportation. The end caps 4302 may be composed of a card-stock, a molded pulp, a plastic, a paper-based material, or any other material known in the art.

Figure 52:
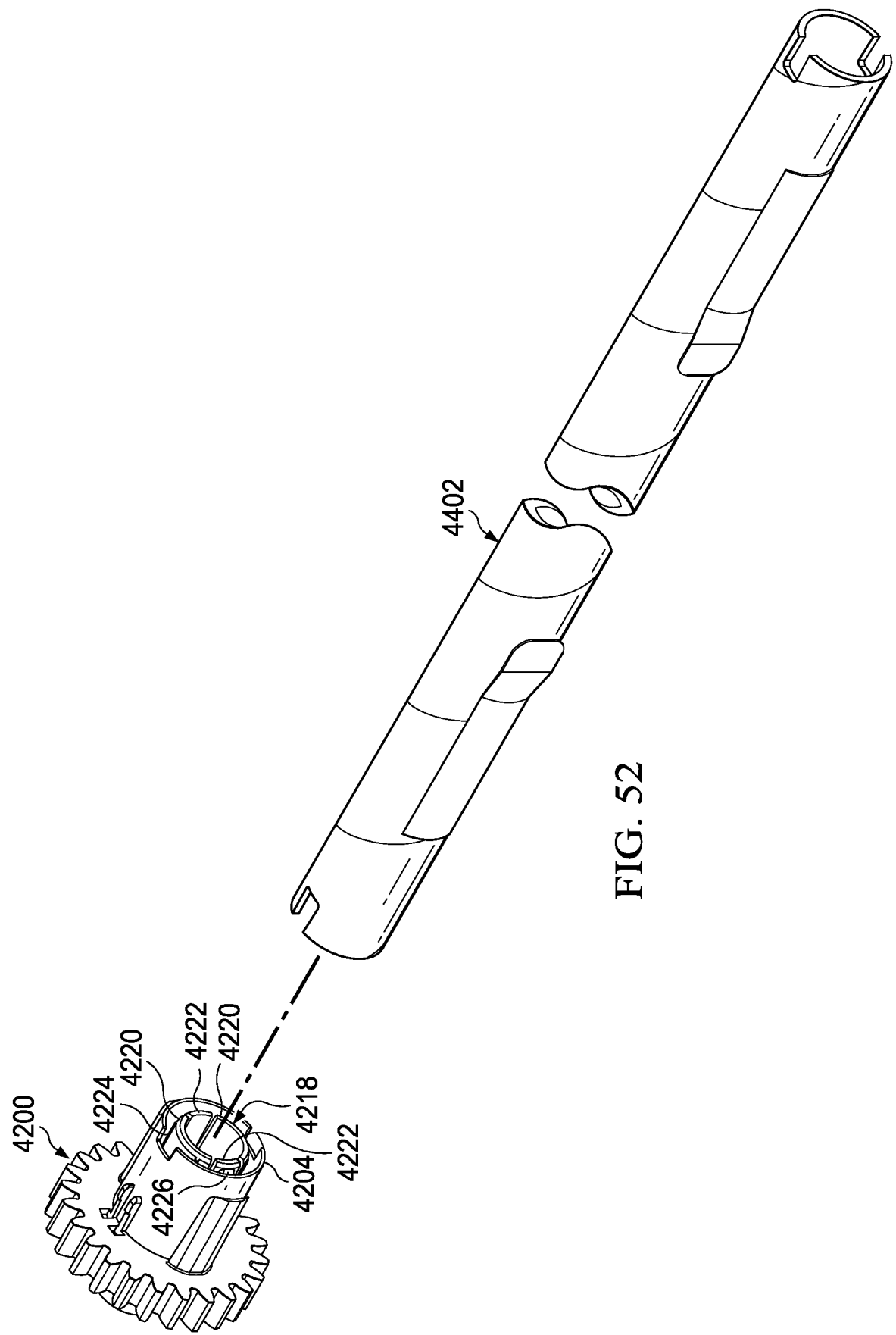
FIG. 52 shows a perspective view of an embodiment of a sprocket adapter and a take-up rod.

With reference to FIGS. 50 and 51, an embodiment of a take-up rod 4402 is shown. The take-up rod 4402 may comprise at least one adhesive 4406 and at least one notch 4408 on at least one end of the take-up rod 4402. The take-up rod 4402 may further comprise an adhesive cover 4404 that removably couple to the at least one adhesive 4406. The adhesive 4406 is configured to couple to a waste pad for winding up around the take-up rod 4402. The at least one adhesive 4406 may be located at an end of the take-up rod 4402 or any location in between the ends. In some embodiments, the rod 4402 comprises two adhesives 4406 located near both ends of the take-up rod 4402. In some embodiments, as shown in FIG. 51, the at least one notch 4408 has non-parallel edges 4410 tapered toward each other at the distal end of the take up rod 4402. The non-parallel edges 4410 enable the at least one notch 4408 to couple the take-up rod 4402 to the at least one inner coupler (not shown) of the sprocket adapter 4200. As shown in FIGS. 52 and 53, the take-up rod 4402 is configured to be removably coupled to the sprocket adapter 4200 by sliding the take-up rod 4402 into the space between the first tube 4204 and the second tube 4218. As the take-up rod 4402 slides between the first tube 4204 and the second tube 4218, the take-up rod 4402 engages with the with the set of protrusions 4224, 4226 extending from the second tube 4218. In one embodiment, the take-up rod 4402 engages with the with the set of protrusions 4224, 4226 extending from the two major distal tube walls 4220 and/or the two minor distal tube walls 4222 of the second tube 4218. The composition of the take-up rod 4402 may comprise a paper-based material, a synthetic polymer, a biodegradable material, metal alloy, or any combination thereof. The take-up rod 4402 has a sufficient stiffness to support the weight of the roll of pads. The two minor distal tube walls 4222 may be configured to bend radially toward the center of the minor distal tube. For example, when the take-up rod 4402 is inserted between the first tube 4204 and the second tube 4218, the take-up rod 4402 may engage the set of protrusions 4224, 4226 and force the minor distal tube walls 4222 inward. The normal force of the minor distal tube walls 4222 pushes against the take-up rod 4402 and helps secure the take-up rod 4402 with the sprocket adapter 4200.

Figure 54:
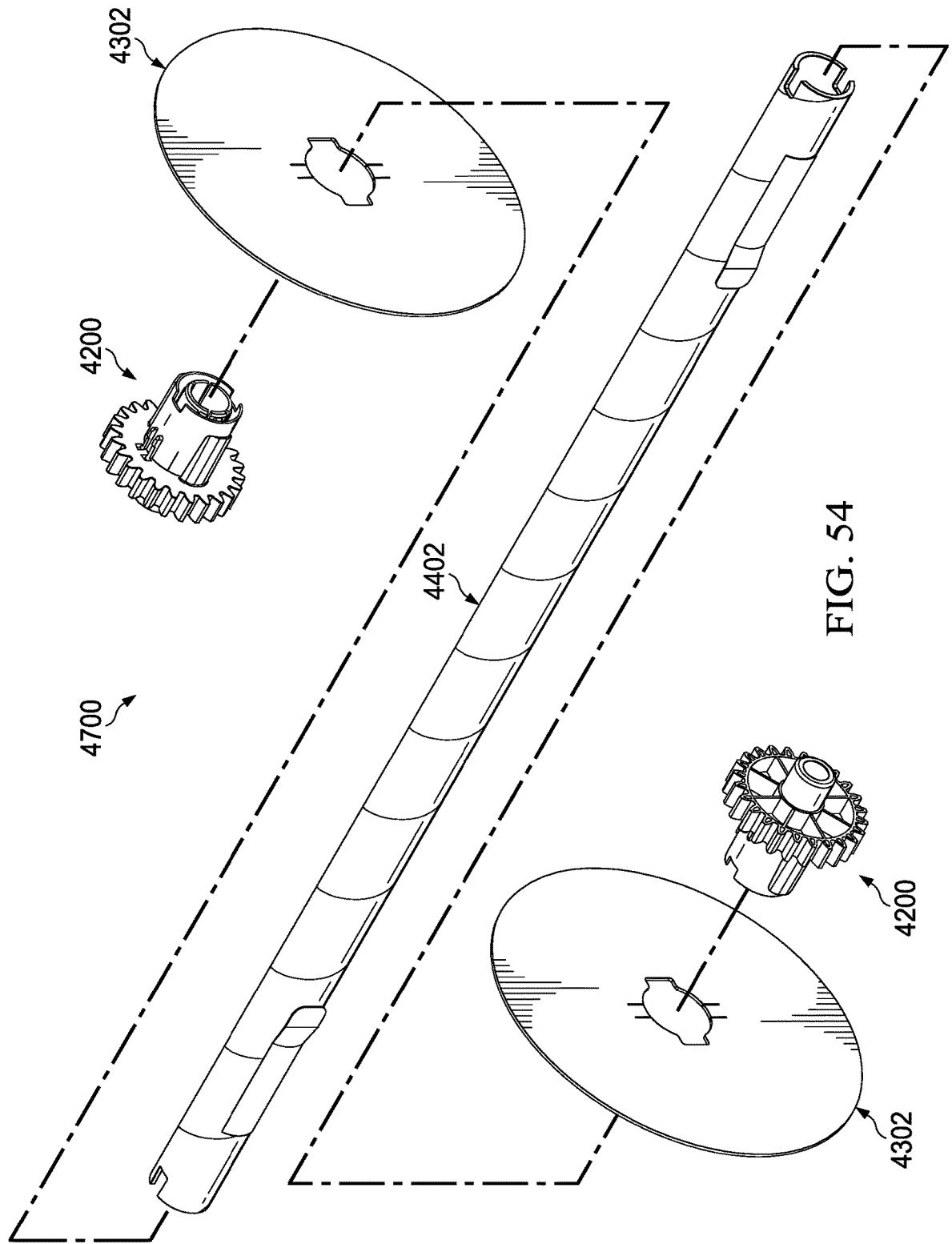
FIG. 54 shows a perspective view of an embodiment of a set of single piece, molded sprocket adapters, a set of end caps, and a take-up rod.
Figures 55, 56:
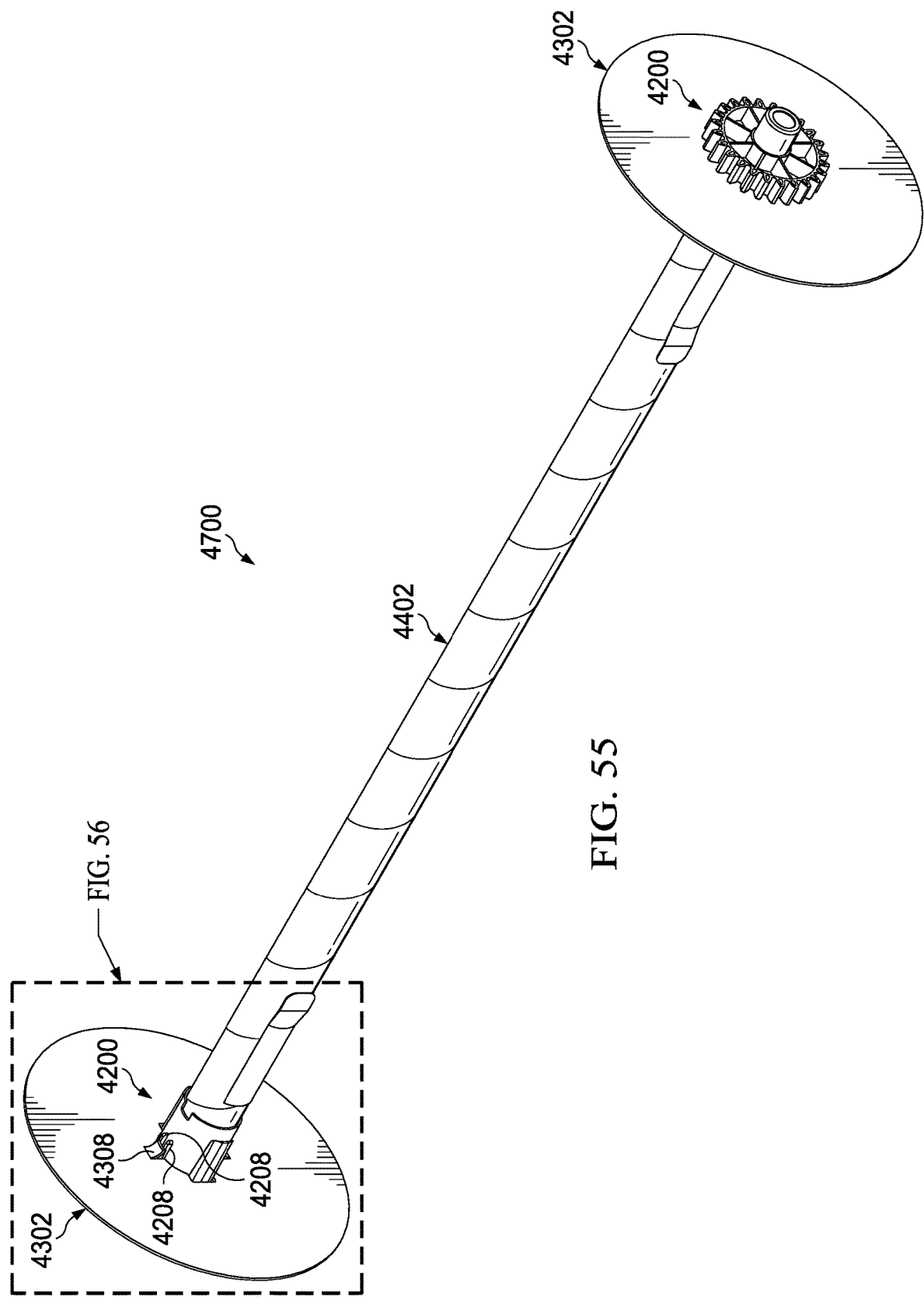
FIG. 55 shows a perspective view of an embodiment of a set of single piece, molded sprocket adapters coupled to a set of end caps and a take-up rod.
FIG. 56 shows a close-up view of an embodiment of a sprocket adapter coupled to an end cap and a take-up rod.
Figure 56:
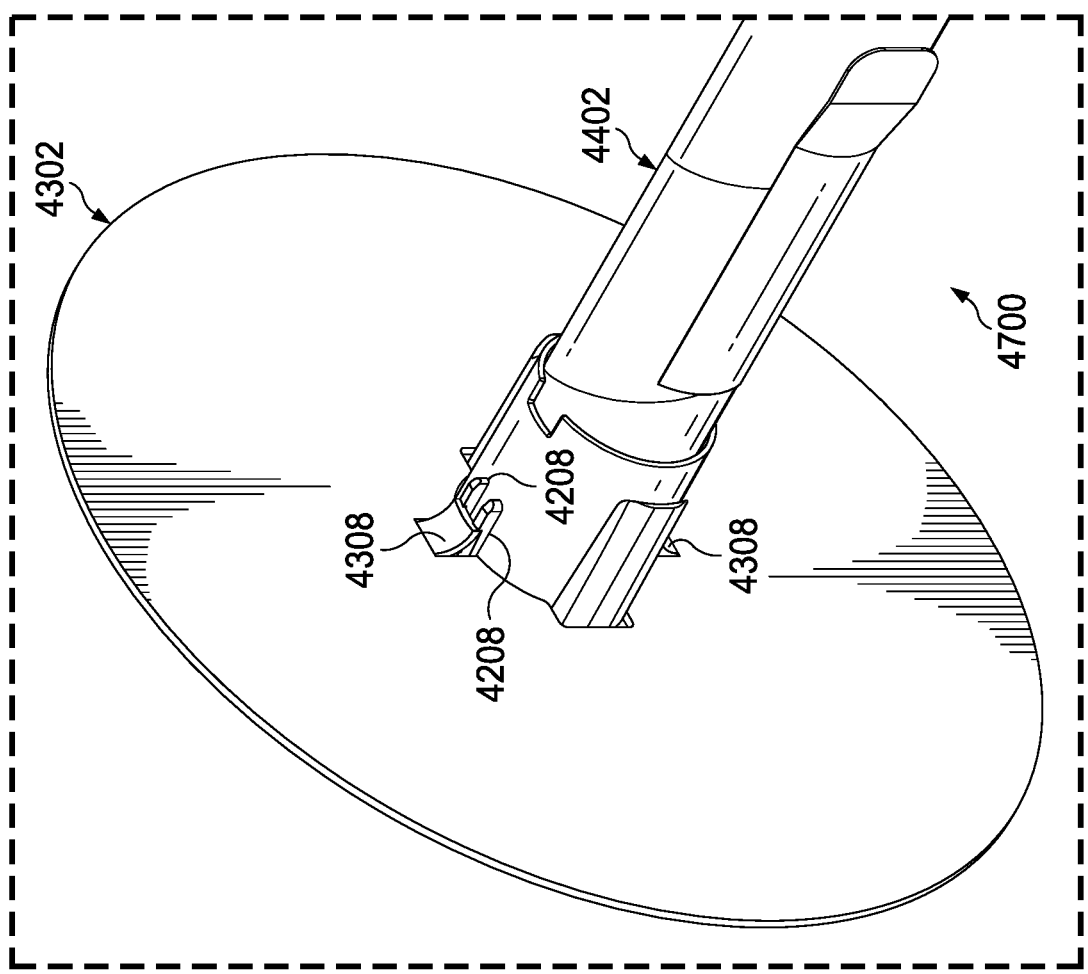

FIGS. 54 to 56 illustrate an embodiment of an assembled pet waste assembly 4700. The set of single piece, molded sprocket adapters 4200 are removably coupled to the set of end caps 4302 by engaging the set of flaps 4308 with the set of outer couplers 4208. In configuration where the at least one outer coupler 4208 includes teeth, the set of flaps 4308 will engage with the teeth (FIG. 48) to increase the retention between the end cap 4302 and the sprocket adapter 4200. Next, the set of single piece, molded sprocket adapters 4200 are removably coupled to the take-up rod 4402. Lastly, a waste pad 4500 is coupled to the set of single piece, molded sprocket adapters 4200 and/or the take-up rod 4402. In some embodiments, the set of single piece, molded sprocket adapters 4200 and set of end caps 4302 may be constructed out of a translucent or transparent material. The advantage of constructing the set of single piece, molded sprocket adapters 4200 and set of end caps 4302 out of a translucent or transparent material is ensure that the components of the pet waste assembly 4700 are assembled correctly. For example, a translucent or transparent set of single piece, molded sprocket adapters 4200 enables a user to see the take-up rod 4402 slide into the space formed between the first tube 4204 and the second slotted tube 4220, which ensures that the notches 4408 of the take-up rod 4402 engage with the set of inner couplers 4228. The engagement between the notches 4408 and the inner couplers 4228 enhances the torque transfer from the sprocket adapters 4200 to the take-up rod 4402. In another example, a translucent or transparent set of end caps 4302 enables a user to see the set of single piece, molded sprocket adapters 4200 when the components of the pet waste assembly 4700 have been assembled and placed into a pet waste machine. The disclosed lengths of the first tube 4204 and the second tube 4218 ensure there is stability in the engagement of the take-up rod 4402 and the sprocket adapters 4200. The stability in the engagement of the take-up rod 4402 and the sprocket adapters 4200 increases as the lengths of the first tube 4204 and the second tube 4218 increase.

Similar to FIGS. 15 to 18, the pet waste assembly 4700 may be configured to couple to a control module. In some embodiments, a pet waste assembly 4700, comprising a take-up rod 4402 coupled to a set of single piece, molded sprocket adapters 4200 and a set of end caps 4302, is placed in a take-up assembly of a pet waste machine 4600. The control module is configured to removably couple to the take-up assembly. When the control module is coupled to the take-up assembly, a gear on the control module engages with the teeth 4210 of the sprocket 4202, which enables the control module to wind a waste pad 4500 around the take-up rod 4402.

It is understood that the present disclosure is not limited to the embodiments described above but encompasses any and all embodiments within the scope of the following claims.

What is claimed is:

1. A sprocket adapter for winding up a waste pad around a take-up rod, the sprocket adapter comprising:
   a sprocket having a first side and a second side;
   a first tube extending perpendicularly from the first side of the sprocket, the first tube comprising:
      a set of inner couplers extending from an inner surface of the first tube configured to couple with the take-up rod,
   a second slotted tube extending perpendicularly from the first side of the sprocket and concentrically located inside of the first tube, the second slotted tube comprising:
      at least one slot extending from a midpoint along the second slotted tube and terminating at a distal end of the second slotted tube, wherein the at least one slot defines at least one minor distal tube wall and at least one major tube distal wall,
      a set of radial protrusions configured to couple with the take-up rod, the radial protrusions oriented on the exterior of the at least one minor distal tube wall and extending to the first side of the sprocket,
      a plurality of linear protrusions configured to couple with the take-up rod, wherein the linear protrusions are located on the exterior of the at least one major tube distal wall and extending downward to the first side of the sprocket,
   a set of fins extending perpendicularly from the first side of the sprocket and exterior to the first tube, the set of fins having at least one linear protrusion extending inward toward the first tube, wherein the at least one linear protrusion is configured to engage with the waste pad.

2. The second slotted tube of claim 1, wherein the set of radial protrusions are oriented with the set of fins.

3. The sprocket adapter of claim 1, wherein the set of fins extend to a distance below the distal end of the first tube.

4. The sprocket adapter of claim 1, wherein the distal ends of the first tube and the second slotted tube end in the same perpendicular plane.

5. The sprocket adapter of claim 1, wherein the first tube is between 10 mm and 50 mm in length and wherein the first tube further comprises a set of slots recessed between 2 mm and 6 mm from the distal end of the first tube toward the first side of the sprocket.

6. The sprocket adapter of claim 1, further comprising a shaft extending perpendicularly from the second side of the sprocket.

7. A sprocket adapter for winding up a waste pad around a take-up rod, the sprocket adapter comprising:
  a sprocket having a first side and a second side;
  an end cap coupled to the first side of the sprocket;
  a first tube extending perpendicularly from the end cap, the first tube comprising a set of inner couplers extending from an inner surface of the first tube configured to couple with the take-up rod,
  a second slotted tube extending perpendicularly from the end cap and concentrically located inside of the first tube, the second slotted tube comprising:
    at least one slot extending from a midpoint along the second slotted tube and terminating at a distal end of the second slotted tube, wherein the at least one slot defines at least one minor distal tube wall and at least one major tube distal wall,
    a set of radial protrusions configured to couple with the take-up rod, the radial protrusions oriented on the exterior of the at least one minor distal tube wall and extending to the first side of the sprocket,
    a plurality of linear protrusions configured to couple with the take-up rod, wherein the linear protrusions are located on the exterior of the at least one major tube distal wall and extending downward to the first side of the sprocket, and
  a set of fins extending perpendicularly from the end cap and exterior to the first tube, the set of fins having at least one linear protrusion extending inward toward the first tube, wherein the at least one linear protrusion is configured to engage with the waste pad.

8. A pet waste roll assembly for winding up a waste pad comprising:
  a waste pad;
  a take-up rod having a first notch and a second notch, wherein the first notch and the second notch are located on opposing ends of the take-up rod;
  a set of single piece, molded sprocket adapters comprising:
    a sprocket having a first side and a second side,
    a first tube extending perpendicularly from the first side of the sprocket, the first tube comprising:
      a set of inner couplers extending from an inner surface of the first tube, the set of inner couplers coupled to the first notch and the second notch of the take-up rod,
    a second slotted tube extending perpendicularly from the first side of the sprocket and concentrically located inside of the first tube, the second slotted tube comprising:
      at least one slot extending from a midpoint along the tube and terminating at a distal end of the second slotted tube, wherein the at least one slot defines at least one minor distal tube wall and at least one major tube distal wall,
      a set of radial protrusions oriented on the exterior of opposite sides of the at least one minor distal tube wall and extending to the first side of the sprocket, the set of radial protrusions coupled to the take-up rod,
      a plurality of linear protrusions located on the exterior of the at least one major tube distal wall and extending downward to the first side of the sprocket, the plurality of linear protrusions coupled to the take-up rod,
    two fins extending perpendicularly from the first side of the sprocket and exterior to the first tube, the two fins having at least one linear protrusion extending inward toward the first tube, wherein the at least one radial protrusion engages the waste pad, and
  a set of end caps removably coupled to the sprocket adapter comprising:
    a base, and
    an aperture through the base, the aperture having two circular portions and two slotted portions, wherein the circular portions are configured to fit around the first tube when the end cap is secured to the sprocket adapter, wherein further the two slotted portions are configured to fit around the set of fins when the end cap is secured to the sprocket adapter.

9. The pet waste roll assembly of claim 8, wherein the inner couplers oppose each other, wherein further the notches of the take-up rod oppose each other, the notches are removably coupled to the inner couplers.

10. The pet waste roll assembly of claim 8, wherein the at least one major distal tube wall comprises one or more opposing axial protrusions.

11. The pet waste roll assembly of claim 8, wherein the at least one minor distal tube wall comprises two opposing axial protrusions configured to fit around the two opposing fins.

12. The pet waste roll assembly of claim 8, wherein the two fins oppose each other, wherein further the slotted portions of the end cap are oppose to each other, the slotted portions fit around the two fins.

13. The pet waste roll assembly of claim 12, wherein each of the two opposing fins comprise two axial protrusions.

14. The pet waste roll assembly of claim 8, wherein the set of notches on the take-up rod have non-parallel edges.

* * * * *